US012775732B2

(12) United States Patent
Chatterjee et al.

(10) Patent No.: US 12,775,732 B2

(45) Date of Patent: Oct. 27, 2026

(54) WEB-BASED DATABASE SYSTEMS AND METHODS

(71) Applicant: THE TORONTO-DOMINION BANK, Toronto (CA)

(72) Inventors: Hirak Chatterjee, Burlington (CA); Florian Gontier, Montreal (CA); Charles Richard Mollo, North Yarmouth, ME (US); Minh Toan Vu, Montreal (CA)

(73) Assignee: The Toronto-Dominion Bank, Toronto (CA)

( * ) Notice: Subject to any disclaimer, the term of this patent is extended or adjusted under 35 U.S.C. 154(b) by 160 days.

(21) Appl. No.: 18/934,799

(22) Filed: Nov. 1, 2024

(65) Prior Publication Data

US 2026/0127303 A1 May 7, 2026

(51) Int. Cl.
*G06F 21/62* (2013.01)

(52) U.S. Cl.
CPC ................................ *G06F 21/6218* (2013.01)

(58) Field of Classification Search
CPC .................................................. G06F 21/6218
See application file for complete search history.

(56) References Cited

U.S. PATENT DOCUMENTS

| | | | |
|---|---|---|---|
| 6,704,873 B1 | 3/2004 | Underwood | |
| 6,996,780 B2 | 2/2006 | Estrada | |
| 7,028,262 B2 | 4/2006 | Estrada et al. | |
| 7,289,973 B2 | 10/2007 | Kiessig et al. | |
| 7,996,429 B2 | 8/2011 | Lowry et al. | |
| 10,346,458 B2 * | 7/2019 | Schwartz | G06F 16/951 |
| 10,693,660 B2 | 6/2020 | Vilvovsky | |
| 10,838,920 B2 | 11/2020 | Carpentier et al. | |
| 10,872,162 B2 * | 12/2020 | Qayyum | G06F 16/24573 |
| 11,249,952 B1 | 2/2022 | Andrews | |
| 11,386,107 B1 | 7/2022 | Walker | |
| 11,507,351 B2 | 11/2022 | Khan | |
| 11,599,693 B2 | 3/2023 | Segev | |
| 2004/0205644 A1 | 10/2004 | Shaughnessy et al. | |
| 2009/0199302 A1 * | 8/2009 | So | G06F 21/6218 726/27 |
| 2011/0173235 A1 | 7/2011 | Aman et al. | |
| 2020/0004759 A1 | 1/2020 | Brebner | |

(Continued)

FOREIGN PATENT DOCUMENTS

| | | |
|---|---|---|
| CN | 113448929 A | 9/2021 |
| WO | 2022229921 A1 | 11/2022 |

OTHER PUBLICATIONS

Joesph Brownell, “File Explorer in Windows 8.1—Tutorial and Instructions”, found at https://www.teachucomp.com/file-explorer-in-windows-8-1-tutorial/, 10/14 (Year: 2014).*

*Primary Examiner* — Piotr Poltorak
(74) *Attorney, Agent, or Firm* — Nixon Peabody LLP

(57) ABSTRACT

Systems and methods for providing a web-based application, that interacts with a flat structure cloud database (i.e., a bucket database) to provide data to client systems, with a file-browser plug-in which presents a file browser tool to users which allows the users to browse the data objects in the flat structure cloud database via a virtual folder hierarchy set forth by the data object key names and controls access to specific data objects and folders based on user role-based permissions.

20 Claims, 10 Drawing Sheets

(56) References Cited

U.S. PATENT DOCUMENTS

| | | | | |
|---|---|---|---|---|
| 2021/0349870 | A1* | 11/2021 | Mangayil | H04L 63/101 |
| 2022/0283678 | A1* | 9/2022 | Arnold | G06F 16/13 |
| 2023/0094856 | A1* | 3/2023 | Ithal | H04L 63/102 726/4 |
| 2023/0138113 | A1* | 5/2023 | Bergeron | G06F 16/2228 707/741 |
| 2023/0153325 | A1 | 5/2023 | Ceesay et al. | |
| 2023/0336592 | A1* | 10/2023 | Narayanaswamy | H04L 63/20 |
| 2026/0032118 | A1* | 1/2026 | Shavers | G06F 21/41 |

* cited by examiner

WEB-BASED DATABASE SYSTEMS AND METHODS

TECHNICAL FIELD

The disclosed example embodiments relate to web-based database systems with file browser functionality and role-based permissioning.

BACKGROUND

A cloud database is a database that is built, deployed, and run in a cloud environment. Some cloud databases, such as, but not limited to, Amazon Web Services (AWS)™ Simple Storage Service (S3)™ (which may also be referred to as Amazon S3), store data in in a flat data structure instead of a hierarchical data structure. Specifically, such cloud databases store objects (e.g., files and their associated metadata) in containers which are referred to as buckets. For example, in AWS S3, to store data, a bucket is created, and a bucket name and an AWS region are selected; then, data is uploaded to that bucket as objects. Buckets can be used to organize data, but unlike conventional hierarchical desktop file systems, buckets cannot be nested. Thus, there is no hierarchy of buckets or sub-buckets.

There are a number of intermediate web services, such as, but not limited to Guidewire ™ InsuranceSuite™, which interact with cloud databases with flat data structures to provide data to client systems. However, these intermediate web services are often limited because of the flat data structure. In particular, as a result of the inherent flat data structure, it may be difficult for users of such intermediate web services to organize data in the flat data structure and/or search for data stored in the flat data structure leading to inefficient file accesses and searches. It may also be difficult for an intermediate web service to display data and group data that has been stored as a flat data structure.

SUMMARY

The following summary is intended to introduce the reader to various aspects of the detailed description, but not to define or delimit any invention.

A first aspect provides web-based database system, the system comprising: a server comprising: a server memory; a server communication interface; and a server processor operatively coupled to the server memory and the server communication interface, the server processor configured to: provide a web-based application including a file browser plugin; authenticate a user of the web-based application using a user credential, the user credential associated with at least one role; in response to authenticating the user: obtain data from one or more bucket databases stored in a cloud computing system using a provider credential associated with the web-based application, wherein each bucket database of the one or more bucket databases stores one or more data objects in a flat data structure and each data object of the one or more data objects is associated with a key name, wherein at least one of the key names comprises a sequence of names separated by a predefined symbol, the sequence of names comprising one or more folder names, and a data object name, and display, using the file browser plugin, a file browser tool for browsing the one or more data objects in the one or more bucket databases; in response to one or more user selections in the file browser tool that identifies a particular bucket database of the one or more bucket databases and a particular folder name, determine whether the at least one role has permission to access the particular bucket database and the particular folder name; in response to determining that the at least one role has permission to access the particular bucket database and the particular folder name, automatically generate and send a search request to the cloud computing system, the search request comprising information identifying the particular bucket database and the particular folder name; subsequent to sending the search request, receive one or more key names for data objects in the particular bucket database, wherein each key name of the received one or more key names comprises a first portion that comprises names in the sequence of names up to and including the particular folder name, and a second portion that comprises names in the sequence of names following the particular folder name; and for at least one key name of the received one or more key names, display, in the file browser tool, a first name in the second portion of that key name.

The second portion of the key name may comprise a subfolder name and a data object name; and the first name in the second portion of that key name may be the subfolder name.

The server processor may be further configured to: in response to the user selecting, via the file browser tool, the subfolder name, determine whether the at least one role has permission to access the subfolder name; in response to determining that the at least one role has permission to access the subfolder name, search all the second portions in the received one or more key names for the subfolder name; and display all or a portion of each key name in the one or more key names that comprises the subfolder name in the second portion of the key name.

The subfolder name may be displayed in a manner that indicates that the subfolder name is a subfolder that comprises downstream data.

The second portion of the key name may comprise the data object name; and the first name in the second portion may be the data object name.

The server processor may be further configured to: in response to the user indicating, via the file browser tool, that an operation is to be to be performed on the object associated with the data object name, determine whether the at least one role has permission to perform the operation on the object; and in response to determining that the at least one role has permission to perform the operation on the object, cause the operation to be performed on the object.

The server processor may be further configured to record, in a history record for the particular bucket database, that the operation was performed on the object, wherein the history record for the particular bucket database is saved in the server memory.

The server processor may be further configured to, in response to the user selecting, via the file browser tool, the history record for the particular bucket database, display the history record for the particular bucket database.

The operation may be one of an edit operation, a download operation and a delete operation.

The file browser tool may display a search field for receiving a search term for a key name; and the server processor may be further configured to, in response to the user entering a search term in the search field: receive the search term via the search field, determine whether the at least one role has permission to conduct a search, in response to determining that the at least one role has permission to conduct the search, search the second portions of the received one or more key names for the search term, and display all or a portion of at least one key name in the one or more key names that comprises the search term in the second portion of the key name.

The second portion of the key name may include the data object name.

The server processor may be further configured to display, in the file browser tool, a name of the particular bucket database and the particular folder name.

The server processor may be configured to generate and send the search request comprising the information identifying the particular bucket database and the particular folder name to the cloud computing system by generating and sending one or more requests to an application programming interface of the cloud computing system.

The one or more requests sent to the application programming interface of the cloud computing system may comprise a GET request.

The server processor may be configured to authenticate the user of the web-based application using the user credential by authenticating the user using the user credential to a single sign on authentication service associated with the user.

At least one of the one or more data objects in the particular bucket database may be a file.

At least one of the one or more bucket databases may be a certificate bucket database that stores a plurality of authentication certificates.

The server processor may be further configured to execute a configuration file that includes names of one or more authentication certificates, and the executing of the configuration file comprises storing the one or more authentication certificates in the certificate bucket database.

A second aspect provides a method for accessing a web-based database, the method executed in a computing environment comprising a server comprising: a server memory; a server communication interface; and a server processor operatively coupled to the server memory and the server communication interface, and the method comprising: providing a web-based application including a file browser plugin; authenticating a user of the web-based application using a user credential, the user credential associated with at least one role; in response to authenticating the user: obtaining data from one or more bucket databases stored in a cloud computing system using a provider credential associated with the web-based application, wherein each bucket database of the one or more bucket databases stores one or more data objects in a flat data structure and each data object of the one or more data objects is associated with a key name, wherein at least one of the key names comprises a sequence of names separated by a predefined symbol, the sequence of names comprising one or more folder names, and a data object name, and displaying, using the file browser plugin, a file browser tool for browsing the one or more data objects in the one or more bucket databases; in response to one or more user selections in the file browser tool that identifies a particular bucket database of the one or more bucket databases and a particular folder name, determining whether the at least one role has permission to access the particular bucket database and the particular folder name; in response to determining that the at least one role has permission to access the particular bucket database and the particular folder name, automatically generating and sending a search request to the cloud computing system, the search request comprising information identifying the particular bucket database and the particular folder name; subsequent to sending the search request, receiving one or more key names for data objects in the particular bucket database, wherein each key name of the received one or more key names comprises a first portion that comprises names in the sequence of names up to and including the particular folder name, and a second portion that comprises names in the sequence of names following the particular folder name; and for at least one key name of the received one or more key names, displaying, in the file browser tool, a first name in the second portion of that key name.

According to some aspects, the present disclosure provides a non-transitory computer-readable medium storing computer-executable instructions. The computer-executable instructions, when executed, configure a processor to perform any of the methods described herein.

BRIEF DESCRIPTION OF THE DRAWINGS

The drawings included herewith are for illustrating various examples of articles, methods, and systems of the present specification and are not intended to limit the scope of what is taught in any way. In the drawings.

DETAILED DESCRIPTION

Figure 1:
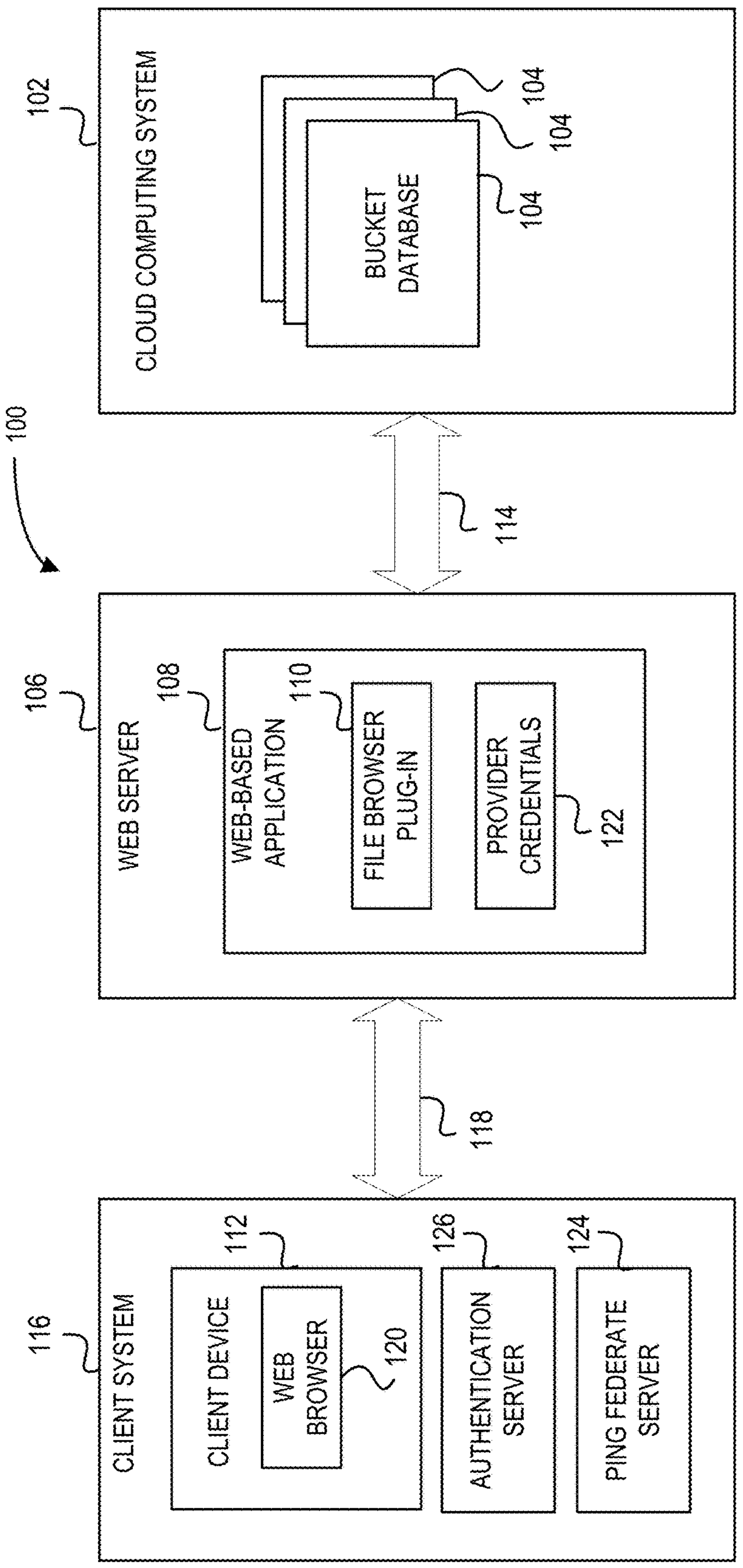
FIG. 1 is a block diagram of an example web-based database system.

As described above, some cloud databases store data in a flat data structure. This flat data structure can limit intermediate web services that provide data to client systems via such cloud databases. Specifically, it can be difficult for a user to organize and/or to search for data in a flat data structure leading to inefficient file accesses and searches.

As described above, in cloud databases with a flat data structure, data is stored in buckets as objects. Each object in a bucket is assigned a key or key name that uniquely identifies the object within the bucket. For example, in Amazon S3 the object key name is a case sensitive sequence of Unicode characters with UTF-8 encoding that is up to 1,024 bytes long. A particular object in a cloud database can be identified by a combination of the bucket name and the object key name.

In some cases, rudimentary support for a virtual hierarchy can be implemented using the object key names. Specifically, a virtual hierarchy within a bucket can be implemented by using object key name prefixes and delimiters. Objects that are to be grouped together can be given object key names with the same prefix (i.e., the objects can be given object key names that begin with a common string). For example, a first object may be given the object key name "Group 1/document1.pdf" and a second object may be given the object key name "Group 1/document 2. pdf" to indicate that the first and second documents are to be grouped together. Object key name prefixes and delimiters, such as, but not limited to, a forward slash ("/") may be used to present a folder structure. For example, an object may be given the key name "Folder_1/Folder_2/document_1.docx" to indicate that the object is in virtual Folder_2which is a sub-folder of virtual Folder_1. Some cloud database providers and third parties have extensions or "apps" that allow users to implement a virtual file structure in a flat data structure cloud database using such object key naming strategies.

However, even when prefixes and delimiters are used to present a folder structure within a bucket, intermediate web services which interact with flat data structure cloud databases to provide data to client systems may lack built-in support for the folder concept, leading to inefficient file accesses and searches and difficulty navigating files for users. Furthermore, some clients may have strict security standards, such as requiring role-based privileges on a per-file (and per-operation) basis. This can make it challenging to use existing cloud database enterprise or third-party extensions or "apps" that may provide virtual folder functionality, since those extensions will not be aware of, or integrated with, the client's authentication database.

Accordingly, described herein are systems and methods for providing a web-based application, that interacts with a flat structure cloud database (i.e., a bucket database) to provide data to client systems, with a file-browser plug-in which presents a file browser tool to users which allows the users to browse the data objects in the flat structure cloud database via a virtual folder hierarchy set forth by the data object key names and controls access to specific data objects and folders based on user role-based permissions.

Specifically, in the systems and methods described herein the data objects in a bucket database are stored with data object key names that comprise a sequence of one or more names separated by a special character (e.g., delimiter). The sequence of one or more names comprises none, one or more than one folder name followed by a data object name. The folder names implement a virtual folder hierarchy. When a user accesses the web-based application they may be authenticated with user credentials that are associated with at least one role (e.g., manager, supervisor, etc.). Once authenticated the file browser plug-in may present a file browser tool to the user. The file browser tool allows the user to browse the data objects in the bucket database in the virtual folder hierarchy set forth by the data object key names.

Specifically, the file browser tool is configured to parse out the individual names in each data object key name in the bucket database so as to present the data objects in the virtual folder hierarchy. For example, when a user first accesses the file browser tool the file browser tool may obtain a list of the key names in the bucket database and parse the data object key names so as to identify the first name in each data object key name and display each unique identified first name. The first name will be either a folder name or a data object name, so in this manner the file browser tool displays the names of the first level folders in the folder hierarchy and the names of any data objects at the root.

The user may then be able to drill down through the folder hierarchy by successively selecting displayed folders. Specifically, if a user selects a first level folder displayed by the file browser tool, the file browser tool may be configured to identify the sub-folders and data objects that are in the selected folder by parsing the data object key names to identify data object key names that start with the selected folder name and then identifying the second name in each of those data object key names. The unique second names are then displayed. Since the second names will either be a sub-folder name or a data object name this displays the sub-folders and data objects that are within the selected first level folder. This process can then be repeated for successive sub-folders.

In some cases, as described in more detail below, the file browser tool may also allow users to perform one or more operations on data objects in the bucket database and/or upload new data objects to the bucket database.

The file browser tool is also configured to use the user's at least one role to control the user's access to the data objects. Specifically, the file browser tool can be configured to check each action taken by the user against the user's at least one role prior to the action being performed. For example, the file browser tool may be configured to check that the at least one role associated with the user has permission to access a particular folder before displaying the contents of that folder to a user; and/or the file browser tool may be configured to check that that the at least one role associated with the user has permission to perform a desired operation on a data object before allowing the user to perform the operation.

The systems and methods described herein provide a web-based application that not only allows users of a client system to access data in cloud database in an efficient manner, without requiring an additional piece of software to act as intermediary, but also in a manner that is consistent with access policies set by the client system.

Reference is now made to FIG. 1, which illustrates a block diagram of an example web-based database system 100. The web-based database system 100 comprises a cloud computing system 102 which is configured to store data in one or more bucket databases 104 in a flat data structure; and, a web server 106, operatively coupled to the cloud computing system 102, that runs a web-based application 108 with a file browser plug-in 110 that allows a user, using, for example, a client device 112 operatively coupled to the web server 106, to browse data in one or more of the bucket databases 104 in a virtual hierarchical data structure in accordance with the user's role-based permissions.

The cloud computing system 102 is a set of computers, such as, but not limited to computer 1000 described below with respect to FIG. 10, that are configured to store data and more specifically, to store data (e.g., a set of files) in one or more bucket databases 104, which may also be referred to herein as simply a bucket. A bucket database 104 is a container that is used to store a set of data. Data (e.g., a set of files) is stored in the bucket databases 104 in a flat data structure. In other words, data can be organized into bucket databases 104, but the bucket databases 104 cannot be nested. Therefore, there is no hierarchy of bucket databases 104 or sub-bucket databases. The bucket database(s) 104 may be implemented by a cloud database or storage provider such as, but not limited, to AWS S3.

The data is stored in each bucket database 104 as objects (which may also be referred to herein as data objects). For example, each data element (e.g., file) may be stored in a bucket database 104 as a data object. In such cases, each data object within a bucket database may be associated with a key or key name that uniquely identifies the data object within the bucket database. For example, as described above, in Amazon S3 the object key name is a case-sensitive sequence of Unicode characters with UTF-8 encoding that is up to 1,024 bytes long. In the examples described herein the data object key name does not comprise the bucket database name and a specific data object can be identified by the combination of the bucket database name and the data object key name.

As described above, in some cases, the object key names may be used to implement a virtual grouping of data in a bucket database 104. Specifically, instead of a data object key name simply comprising the unique name of the data object it may also comprise a prefix which indicates how that object is to be grouped with other objects in the same bucket database 104. Specifically, data objects that have the same prefix are to be grouped together. The phrase "prefix of a data object key name" is used herein to refer to the portion of the data object key name preceding the object name.

The prefix of a data object key name may be separated from the data object name, by a predefined symbol (e.g., a delimiter). For example, if a forward slash ("/") is the delimiter, the portion of the object data key name prior to the delimiter (e.g., forward slash ("/")) may be referred to as the prefix. For example, if a bucket database 104 comprises the following data object key names, the data objects dataobject1.pdf and dataobject2.pdf are to be grouped together since they share the same prefix ("Folder_1") and data objects dataobject3.pdf and dataobject4.pdf are to be grouped together since they share the same prefix ("Folder_2"). In the example below the data objects are all PDF files, however, this is just an example of data objects which may be stored in a bucket database 104.

Folder_1/dataobject1.pdf
Folder_1/dataobject2.pdf
Folder_2/dataobject3.pdf
Folder_2/dataobject4.pdf In some cases, prefixes and delimiters may be used to implement a virtual folder hierarchy within a bucket database 104. In such cases, the prefix portion of an object key name may comprise a sequence of one or more folder names, wherein multiple folder names in a prefix are separated by the delimiter, and a subsequent folder name in a prefix is interpreted as a sub-folder of a preceding folder name in the prefix such that the folders form a path. For example, if a bucket database 104 comprises the following object key names then "Folder_A" and "Folder_B" are interpreted as the first level folders in the hierarchy, "SubFolder_A-1" and "Sub_Folder_A-2" are interpreted as subfolders of "Folder_A", "Sub-SubFolder_A-2-1" is interpreted as a sub-folder of "SubFolder_A-2", and "SubFolder_B-1" is interpreted as a sub-folder of "Folder_B".

Folder_A/SubFolder_A-1/dataobject1
Folder_A/SubFolder_A-1/dataobject2
Folder_A/SubFolder_A-2/Sub-Subfolder_A-2-1/dataobject3
Folder_A/SubFolder_A-2/Sub-Subfolder_A-2-1/dataobject4
Folder_A/SubFolder_A-2/Sub-Subfolder_A-2-1/dataobject5
Folder_A/dataobject6
Folder_B/SubFolder_B-1/dataobject7
Folder_B/SubFolder_B-1/dataobject8

Accordingly, in such cases, a key name may or may not comprise a prefix portion (i.e., it may not comprise a prefix portion if it is not in a folder—i.e., it is at the root of the folder structure), and if a key name comprises a prefix portion, the prefix may comprise one or more folder names separated by a delimiter.

As described in more detail below, in some cases, the cloud computing system may be configured to grant access to data objects in the bucket database(s) 104 on a per bucket database 104 basis.

The web server 106 is a computer or set of computers which run a web-based application 108. The web server 106 is connected to the cloud computing system 102 over a data communications link 114. The web-based application 108 is configured to interact with the cloud computing system 102 to provide data stored in one or more of the bucket databases 104 to a client system 116. Specifically, a user of the client system 116 may access the web-based application 108, via, for example, a client device 112 that is connected to the web server 106 over a data communications link 118. In some cases, the user may access the web-based application 108 via a web browser 120 of the client device 112.

The web-based application 108 may allow the user to access a bucket database 104 or specific data objects (e.g., files) within that bucket database 104. Specifically, via the web-based application 108 the user may request access to data objects in one or more bucket databases 104. In response to the user requesting access to a particular bucket database 104, the web-based application 108 may send one or more requests to the cloud computing system 102 to access that particular bucket database 104.

In some cases, the cloud computing system 102 is configured to only grant an access request (e.g., provide access to a bucket database 104) if the requestor (e.g., the web-based application 108) has been authenticated to access the bucket database 104. In such cases, the web-based application 108 may be supplied with provider credentials 122 for one or more bucket databases 104. For example, in Amazon S3, permissions and provider credentials may be granted through an AWS Identity and Access Management (IAM) policy, such as a bucket policy.

The web-based application 108 may then use the provider credentials 122 associated with a requested bucket database 104 to authenticate itself to the cloud computing system 102 with respect to that bucket database 104. This type of authentication may be referred to as provider-level authentication. Since the provider credentials 122 are granted to the web-based application 108 itself, the same providers credentials 122 are used to access the same bucket database 104 regardless of the user requesting access to that bucket database 104.

For example, as described in more detail below, in Amazon S3, an access request related to a particular bucket database 104 may be made through REST API calls, such as, but not limited to, a GET call. In these cases, each entity that is allowed to access a bucket database 104 may be provided with provider credentials (i.e., an access key ID and secret key) which the entity can use to authenticate itself to the cloud computing system 102 with respect to the bucket database 104. Specifically, the entity may be configured to include in any access request (e.g., a GET request) its access key ID and a signature generated from the access request message and the secret key. The cloud computing system 102 then uses the access key ID to retrieve the secret key, generates a signature from the access request message and the secret key and compares the two signatures to make sure they match. Only if the signatures match is the requestor granted access to the bucket database.

Through the web-based application 108 a user may be able to see what data objects (e.g., files) are in one or more bucket databases 104, and may be able to perform one or more operations, such as, but not limited to, viewing/reading, updating, and deleting, on data objects (e.g., files) in those bucket database(s) 104. In some cases, a user may also be able to add new data objects to those bucket databases 104.

However, as described above, it may be difficult for users to be able to identify relevant data objects in the flat data structure implemented by the bucket database(s) 104. Furthermore, some client systems 116 may have strict security standards, such as requiring role-based privileges on a per-data object (e.g., file) or per folder basis. However, not only does the cloud computing system 102 not typically have access to the client's authentication database, but since the provider-level authentication generally provides for access to the entire contents of a bucket database 104, it is not suitable for end-user level access control.

Accordingly, to allow users to more easily search for data items in the bucket database(s) 104 and to enforce user role-based permissioning the web-based application 108 has a built-in file browser module in the form of a file browser plug-in 110. Specifically, the file browser plug-in 110 is configured to provide a file browser tool that presents the data objects (e.g., files) in a selected bucket database 104 in a folder hierarchy as specified by the data object key names and enforces access to folders and/or data objects within the selected bucket database 104 based on roles assigned to the user within the client system 116.

Figure 2:
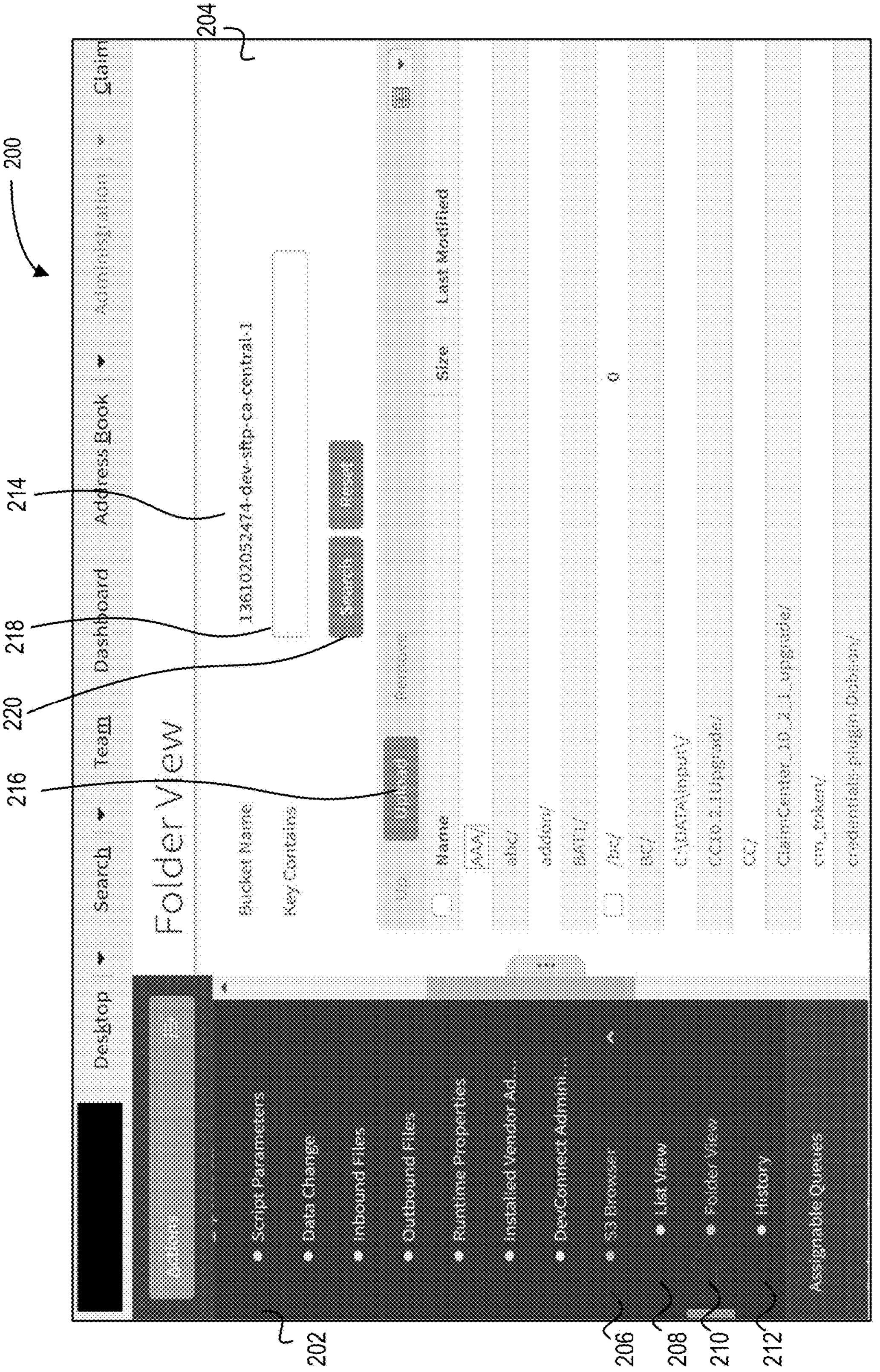
FIG. 2 is a schematic diagram of an example graphical user interface (GUI) that displays a folder view of an example bucket database that has a flat data structure.

In some cases, the user may be able access the file browser tool from the web-based application 108 by making a selection in the web-based application 108. For example, the web-based application 108 may provide a graphical user interface (GUI), or the like, which allows the user to select or otherwise activate the file browser tool. A first example of such a GUI 200 is shown in FIG. 2. The example GUI 200 comprises an action section 202 which lists a number of actions which the user can activate by selecting that action, and a display section 204 which displays information related to the selected action. In this example, the user may access the file browser tool by selecting the "S3 Browser" action 206 (or, as described in more detail below, the "Folder View" sub-action 210) in the action section 202.

In some cases, the user may only be granted access to the file browser tool if the user has been authenticated using user credentials wherein the user credentials are associated with at least one role (e.g., manager, super user, etc.). In some cases, the user may be authenticated via their user credentials when they first access the web-based application 108. In other cases, the user may be authenticated via their user credentials the first time, during a web-based application session they access the file browser tool. In some cases, the user may be able to be authenticated to the web-based application 108 using their client system credentials (e.g., via single sign on (SSO)). For example, when the web-based application 108 wants to authenticate the user (e.g., when the user first attempts to access the web-based application or when the user first attempts to access the file browser tool thereof) an authentication request may be sent to a Ping Federate server 124 of the client system 116. A Ping Federate server allows enterprises to securely share identity information, to provides SSO. In other words, a Ping Federate server allows services provided by one enterprise to be accessed by authentication provided by a second enterprise. The Ping Federate server 124 may then forward the request to an authentication server 126 within the client system 116 which may ask the user to enter their user credentials. The authentication server 126 may then authenticate the user based on the credentials.

Once the user has activated the file browser tool then the file browser tool can be used to browse the data objects (e.g., files) in one or more bucket databases 104 that the web-based application 108 has access to (e.g., has provider credentials for). More particularly, the file browser tool can be used to browse the data objects in one or more bucket databases in a folder hierarchy set forth by the data object key names in the one or more bucket databases. Specifically, as described above, the key names of the objects in a bucket database can be used to specify a virtual folder structure for the data objects within that bucket database even though the data objects are stored within that bucket database in a flat data structure. The file browser tool is configured to interpret the object key names in a bucket database as specifying a hierarchical folder structure and display the data objects in the bucket database 104 in accordance with the specified hierarchical folder structure.

In some cases, once the file browser tool has been activated the file browser tool may send a request to the cloud computing system 102 for a list of the object key names for the data objects in a particular bucket database 104. In response, the cloud computing system 102 may provide a list of data object key names in the particular bucket database to the file browser tool. The file browser tool may then display (e.g., in the display section 204 of the GUI 200 of FIG. 2) the data objects in the particular bucket database to the user accordance with the hierarchical folder structure specified by the received data object key names. In some cases, the file browser tool may be configured to decipher the received object key names to identify (i) the top-level folder names; and (ii) and the names of objects at the root and display (i) and (ii). Where the object key names are structured, as described above, to have an (optional) prefix portion preceding the data object name wherein the prefix portion comprises a sequence of one or more folder names (each folder name separated by a delimiter (e.g., a forward slash ("/")), then the file browser tool may be configured to, for each received data object key name: determine whether the object key name has a prefix portion (e.g., does it comprise at least one delimiter?); if it is determined that the data object key name does have a prefix portion, select the first file name in the prefix portion (e.g. the text (with at least one character) up until the first delimiter) and, if it is not already displayed, display it as a first level folder name; and if it is determined that the data object key does not have a prefix portion (indicating it is a data object) at a root of the hierarchical folder structure, display the data object name. In other words, if each data object key comprises a sequence of one or more names separated by a delimiter, then the filer browser to tool may be configured to identify the first name in each of the received data object key names and display each unique first name.

For example, if the particular bucket database 104 comprises objects with the following key names and the forward slash ("/") is the delimiter, then when that bucket database 104 is selected the file browser tool may be configured to display the highest-level or first level folder names ("AAA", "abc", "addon", "BAT1", "/bc", "BC", "C:\DATA\input\", "CC10.2.1Upgrade", . . . ) in the display section 204, as shown in FIG. 2. As shown in FIG. 2, the file browser tool may also display the particular bucket database name 214 (e.g., "136102052474-dev-sftp-ca-central-1") in the display section 204 so that user knows which bucket database is currently being accessed.

AAA/dataobject1
AAA/sub-folder1/dataobject2
abc/dataobject3
addon/dataobject4
addon/sub-folder2/dataobject5
BAT1/dataobject6
/bc/dataobject7
BC/dataobject8
C:\DATA\input\/dataobject9
CC10.2.1Upgrade/dataobject10
CC/dataobject11
CC/sub-folder3/dataobject12
ClaimCenter_10_2_1_upgrade/dataobject13
cm_token/dataobject14
credentials-plugin-Dobson/dataobject15
. . .

In some cases, the web-based application 108 may only be authorized to access a single bucket database 104. In such cases, once the file browser tool has been activated, the file browser tool may be configured to automatically request, from the cloud computing system 102, the object data key names for the data objects in that single bucket database 104. In other cases, the web-based application 108 may be authorized to access multiple bucket databases. In such cases, when the file browser tool has been activated the user may be presented with a list of bucket databases 104 that can be accessed, and the user may be able to select or otherwise indicate which of the listed bucket databases the user wishes to access. In such cases, the file browser tool may be configured to determine whether the at least one role associated with the user is authorized to access the selected bucket database, and only obtain, from the cloud computing system 102, the data object key names for the data objects in the selected bucket database 104 if the at least one role associated with the user has permission to access the selected bucket database 104.

Once the user has been presented with the data objects in the particular bucket database 104 in accordance with the hierarchical folder structure specified by the data object key names (e.g., once the highest level or first level folder names and the names of any root data objects are displayed) the user may be able to select one of the displayed folder names (e.g. to drill down into the folder with that folder name). In some cases, the user may be able to select one of the displayed folder names by clicking on that folder name. However, in other examples, the user may be able to select a listed folder name in another manner.

If the user selects a displayed folder name, the file browser tool may be configured to determine whether the at least one role associated with the user has permission to access the selected folder name within the particular bucket database. This allows the file browser tool to implement per folder access control that is tied to a user's role (or roles). If it is determined that the at least one role associated with the user does not have permission to access the selected folder name within the particular bucket database, then the user may be notified that they do not have sufficient permissions to access the selected folder name (e.g., the file browser tool may display an error message or a notification message). If, however, it is determined that the at least one role associated with the user has permission to access the folder with the selected folder name within the particular bucket database, the file browser tool may be configured to automatically generate and send a search request to the cloud computing system 102 that identifies the particular bucket database and the selected folder name.

In response to sending the request to the cloud computing system 102, the file browser tool may receive from the cloud computing system 102 data object key names in the particular bucket database that comprise the selected folder name in the prefix portion thereof. Each of the received key names can be divided into two portions-a first portion and a second portion. The first portion comprises one or more names (separated by a delimiter) wherein the last of the one or more names is the selected folder name; and the second portion immediately follows the first portion and comprises one or more names (separated by a delimiter) wherein the last of the one or more names in the second portion is the data object name. In other words, the first portion of each key name comprises the names in the prefix section of the key name up to and including the selected folder name, and the second portion comprises the remaining names in the key name up to and including the object name. For example, if the selected folder name is "FolderA" and the key name is "FolderA/FolderB/FolderC/dataobject1", then the first portion of the key name is "FolderA" and the second portion of the key name is "FolderB/FolderC/dataobject1".

The file browser tool may then be configured to, for each received data object key name, identify the first name in the second portion and, if that name is not already displayed, display that name (e.g., in the display section 204 of the GUI). In this way, the file browser tool displays the next level folders in the selected folder name and any data objects that sit directly in the selected folder name.

Figure 3:
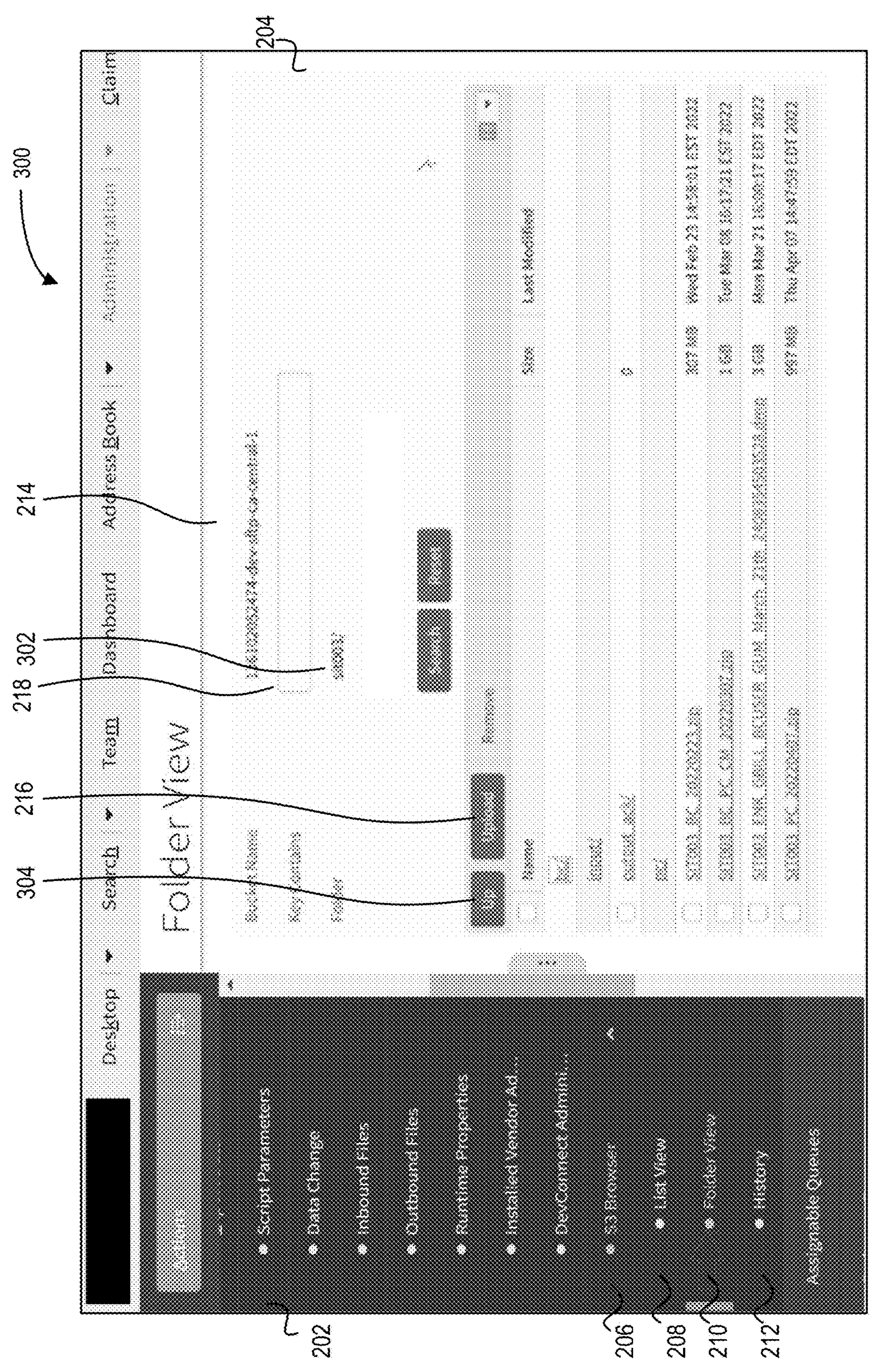
FIG. 3 is a schematic diagram of the GUI of FIG. 1 that displays a folder view of the example bucket database after the user has selected a particular folder.

For example, if a bucket database has the following data object key names and the user selects the "sit003/" folder then, as shown in FIG. 3, the display section 204 of the GUI 300 (which is the GUI 200 of FIG. 2 after the user has selected the "sit003/" folder) will display sub-folders "bc", "input", "output_ack", and "pc" and data objects "SIT003_BC_20220223.zip", "SIT003_BC_PC_CM_20220307.zip", "SIT003_ENK_GBILL_BCUSER_GUM_March_21th_2408354503528.dmp" and "SIT003_PC_20220407.zip". In some cases, in addition to receiving a set of data object key names in response to a search request, the file browser tool may also receive information (e.g., metadata) related to the corresponding data objects, such as, but not limited to, the size of the data object and the data and time the data object was last modified and, as shown in FIG. 3, all or a portion of that information may be displayed alongside a data object name.

sit002/dataobjectA
sit002/sub-folderA/dataobjectB
sit003/bc/dataobjectC
sit003/input/dataobjectD
sit003/output_ack/dataobjectE
sit003/pc/dataobjectF
sit003/pc/dataobjectG
sit003/SIT003_BC_20220223.zip
sit003/SIT003_BC_PC_CM_20220307.zip
sit003/SIT003_ENK_GBILL_BCUSER_GUM_March_21th_2408354503528.dmp
sit003/SIT003_PC_20220407.zip
wdb/dataobjectH
. . .

As shown in FIG. 3, after a folder has been selected, in addition to displaying the bucket database name 214, the display section 204 of the GUI 300 may also display the selected folder name 302. Also, as shown in FIG. 3, once at least one folder has been selected an "Up" button 304 in the display section 204 of the GUI 300 may become available which, when clicked or otherwise selected, takes the user back to the parent folder in the hierarchy. For example, clicking the "Up" button 304 in the GUI 300 of FIG. 3 may take the user back to the root of the "136102052474-dev-sftp-ca-central-1" bucket database (i.e., the GUI 200 of FIG. 2 may be displayed).

The user may be able to continue to drill down to displayed sub-folder names in the same manner—i.e., by selecting or otherwise activating the sub-folder name. Specifically, when a sub-folder name is selected by the user the file browser tool may be configured to first determine whether the at least one role associated with the user is permitted to access the selected sub-folder name. Once it has been determined that the at least one role associated with the user is permitted to access the selected sub-folder name, the file browser tool analyses the data object key names in the bucket database to identify the names of the sub-folders and data objects in the selected folder and displays those sub-folder names and data object names.

In some cases, the file browser tool may be configured to identify the names of the sub folders and data objects in the selected folder by analysing the data object key names received in response to the parent folder search and specifically the second portions thereof. Specifically, the file browser tool may be configured to identify, from the data object key names received in response to the parent search request, data object key names wherein the first name in the second portion thereof is equal to the selected sub-folder name. Then, for each of those data object key names, identify the name therein that immediately follows the selected folder name in the second portion—this will either be a sub-folder name or a data object name. In other cases, the file browser tool may be configured to identify the names of the sub-folders and data objects in the selected folder by sending a new search query to the cloud computing system 102 for a list of data object key names in the bucket database in which the prefix portion starts with a sequence of names that matches the folder path (e.g. "first folder name/sub-folder name/". The file browser tool may then, for each received data object key name, identify the name therein that immediately follows the sequence of names in the prefix portion that matches the folder path.

Figure 4:
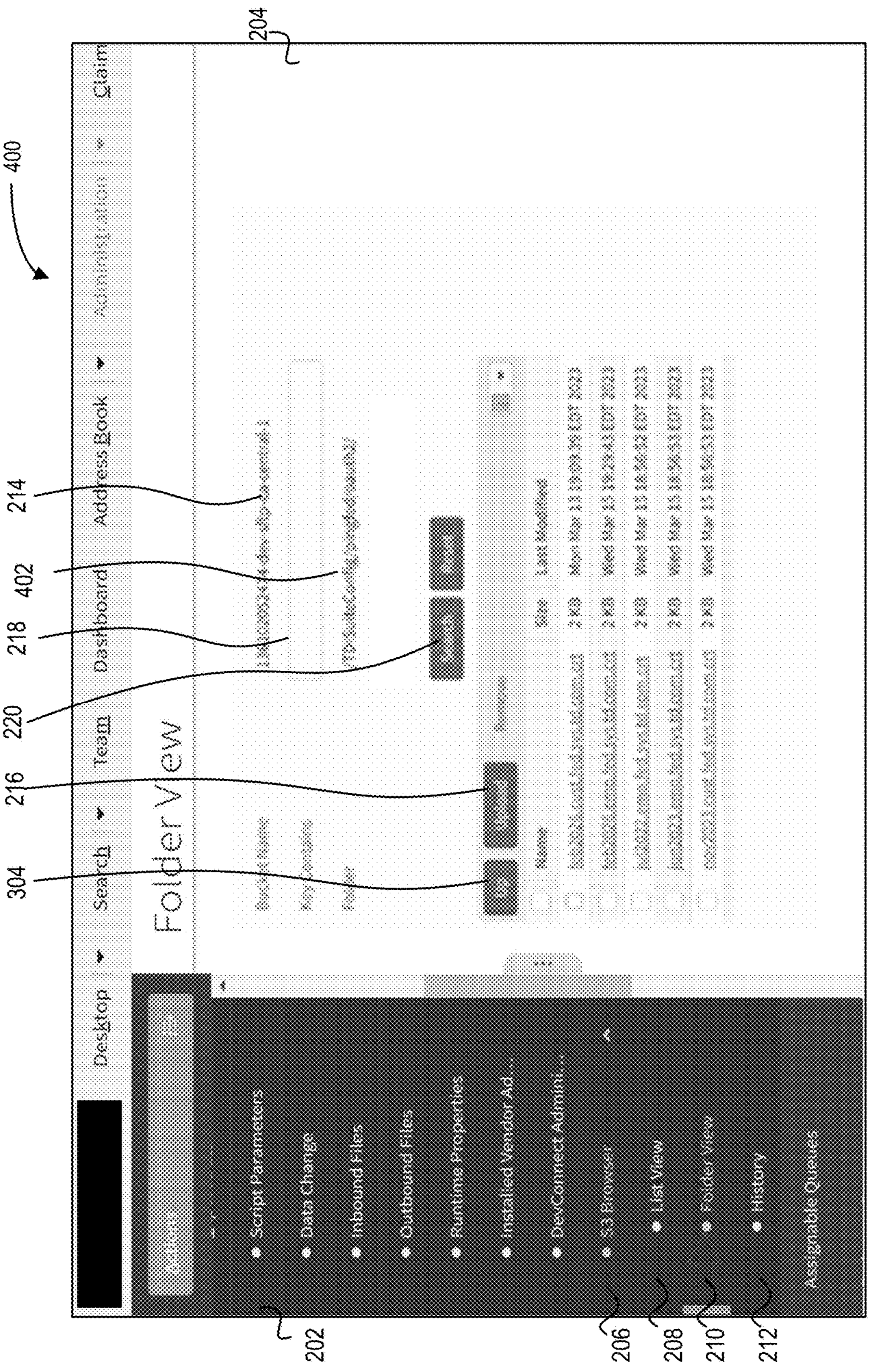
FIG. 4 is a schematic diagram of the GUI of FIG. 1 that displays a folder view of the example bucket database after the user has selected a series of folders and sub-folders.

In either case, once the user has selected a sub-folder or a series of sub-folders the file browser tool may update the GUI to display the full path of folders selected. For example, FIG. 4 shows an example GUI 400, which is the GUI 200 of FIG. 2, after the user has selected the "TDISuiteConfig" folder, then the "pingfed" sub-folder" and then the "oauth2" sub-folder. In this example, the full folder path 402 of "TDISuiteConfig/pingfed/oauth2" is displayed in the display section 204.

Performing Operations on Data Objects in Bucket Database

In some cases, in addition to allowing a user to browse the data objects in one or more bucket databases 104 via the hierarchical folder structure presented by the data object key names, the file browser tool may also allow the user to perform one or more operations on data objects in the one or more bucket databases 104. In some cases, the user may be able to perform a desired operation on a data object by using the file browser tool to select a displayed data object and indicate an operation to be performed on the selected data object. The one or more operations may include one or more of viewing/downloading the data object, modifying the data object and deleting/removing the data object. For example, in the example GUI 200, 300, 400 of FIGS. 2-4 the user may select a data object name displayed in the display section 204 by clicking on the data object name or ticking the box to the left of the data object name. When the user clicks on a data object name the user may be presented with a list of operations that can be performed on the selected data object, such as, but not limited to view/download, edit/modify and delete/remove and the user may have the ability to select one of the listed operations. In some cases, when the user ticks the box to the left of a data object name a "Remove" button may appear (it is greyed out in the GUIs 200, 300, 400 shown in FIGS. 2-4), and the user can delete the data object for which the box is ticked by clicking or otherwise activating the "Remove" button.

Once the user has selected a data object and indicated an operation to perform on that data object, the file browser tool may be configured to first determine whether the at least one role associated with the user has permission to perform the indicated operation on the selected data object. If it is determined that the at least one role associated with the user does not have permission to perform the desired operation on the selected data object, then the user may be notified that they do not have the appropriate permissions to perform the desired operation (e.g., the file browser tool may display an error message or a notification message). If, however, it is determined that the at least one role associated with the user does have permission to perform the desired operation then the file browser tool causes the identified operation to be performed on the selected. How the file browser tool causes the identified operation to be performed may depend on the identified operation. For example, if the operation is a "view" or "download" operation then the file browser tool may send a download request to the cloud computing system 102 comprising the bucket name and the data object name, and in response to the request, the file browser tool may receive the selected data object and display the contents of the selected data object to the user in for example, the display window or another window. Where, however, the operation is a "delete" or "remove" operation then the file browser tool may send a delete request to the cloud computing system 102 comprising the bucket name and the data object name, and in response the cloud computing system 102 may delete the data object from the bucket database 104.

In some cases, in addition to, or alternative to, the file browser tool allowing users (with appropriate permissions) to perform operations on existing data objects in one or more bucket databases 104, the file browser tool may be configured to allow users (with appropriate permissions) to add or upload new data objects (e.g., files) to the one or more bucket databases. Specifically, once a user has selected a bucket database and a folder path within that bucket database, the user may be able to provide input to the file browser tool indicating that they wish to add a new data object to the folder path of the bucket database. A folder path may specify none, one, or more than one folder. A folder path with no folders indicates that the path or location is at the root of the bucket database. In some cases, the file browser tool may update the GUI to have a button or other input element that the user can activate to indicate that they wish to add a data object to the currently selected bucket database and folder path within that bucket database.

For example, the GUI 200, 300, 400 shown in FIGS. 2-4 comprises an "Upload" button 216 which when clicked, or otherwise selected, indicates to the file browser tool that the user wishes to add a data object to the currently selected bucket database and folder path within that bucket database.

Specifically, in the example GUI 200 of FIG. 2 the currently selected bucket database is the "136102052474-dev-sftp-ca-central-1" bucket database and the folder path is a null folder path (i.e., it is the root of the bucket database). Thus, if the user clicked or otherwise selected the "Upload" button 216 in the GUI 200 of FIG. 2 the user indicates to the file browser tool that they wish to upload a new data object to the root of the "136102052474-dev-sftp-ca-central-1" bucket database. Similarly, in the example GUI 400 of FIG. 4, the currently selected bucket database is the "136102052474-dev-sftp-ca-central-1" bucket database and the current folder path is "TDISuiteConfig/pingfed/oauth2" path. Thus, if a user clicked or otherwise selected the "Upload" button 216 in the GUI 400 of FIG. 4, the user indicates to the file browser tool that they wish to upload a new data object to the "oauth2" folder of the "136102052474-dev-sftp-ca-central-1" bucket database which is a sub-folder of the "pingfed" folder, which is itself a sub-folder of the "TDISuiteConfig" folder.

Once the user has indicated that they wish to add or upload a file to the currently selected bucket database and folder path within that bucket database (e.g., by clicking on the "Upload" button 216) then the file browser tool may be configured to first determine whether the at least one role associated with the user has permission to upload a data object to the currently selected folder path within the currently selected bucket database. If it is determined that the at least one role associated with the user does not have permission to upload a data object to the currently selected folder path of the currently selected bucket database, then the user may be notified that they do not have sufficient permissions to perform the desired upload (e.g., an error message or a notification message may be displayed). If, however, it is determined that the at least one role associated with the user does have permission to upload a data object to the currently selected folder path of the currently selected bucket database, then the file browser tool may be configured to cause the upload of a new data object to the currently selected folder path of the currently selected bucket database. The file browser tool may be configured to cause a new data object to be uploaded to the currently selected folder path of the currently selected bucket database by providing an interface to the user which allows the user to select the data object (e.g., file) that they wish to upload and the data object name, and once the user has selected the data object (e.g., file) they wish to upload, the file browser tool may send to the cloud computing system 102 the selected data object along with instructions to store the data object in the selected bucket database with a data object key name that is equal to the currently selected folder path+the specified object data name. For example, if the object data name is "objectdatanameX" and the currently selected folder path is "TDISuiteConfig/pingfed/oauth2", then the instruction may specify that the data object is to be stored in the bucket database with an object key name of "TDISuiteConfig/pingfed/oauth2/objectdatanameX".

History

In some cases, when the file browser tool is configured to allow a user to perform one or more operations on existing data objects in a bucket database and/or to upload new data objects to a bucket database, the file browser tool may be configured to keep a record for each bucket database (that the web-based application has access to) of each operation and/or each upload performed for that bucket database. Such a record may be referred to as the history record for the bucket database. The history record may be stored in the memory of the web server 106. In some cases, the file browser tool may be configured to, each time a user performs an operation on an existing data object in a particular bucket database and/or each time a user uploads a new data object to the particular database, record, in the history record, that the operation was performed or that the new data object was uploaded. The information recorded for each operation, and/or each upload may comprise one or more of the name or data object key name of the data object that was operated on or uploaded, the action (operation or upload) that was performed, the user that performed the action, and the date and/or time that the action was performed. Cloud database providers do not typically record information on the actions that are performed on a bucket database hosted thereby, and if even a cloud database provider did store such information it would not have related user information. Accordingly, the history record provides information that would not otherwise be available. The history record for a bucket database may be used by, for example, a client administrator to perform an audit.

In some cases, the file browser tool may be configured to allow a user to view the history record for a bucket database by indicating via, for example, the GUI presented by the web-based application that they wish to view the history record for a bucket database. For example, as shown in FIGS. 2-4, the GUI 200, 300, 400 may comprise a "History" sub-action 212 in the action section 202 which the user can click, or otherwise select, to indicate that they wish to view the history record for a bucket database. This is an example only and in other examples the user may be able to indicate that they wish to view the history for a bucket database in another manner.

If, when the user indicates that they wish to view the history record for a bucket database, the bucket database is known, (e.g., because the web-based application only has access to a single bucket database or the web-based application has access to multiple bucket databases and the user has already selected a bucket database (e.g., when the user activated the file browser tool), the file browser tool may be configured to determine whether the at least one role associated with the user has permission to access the history record for the bucket database. If, however, when the user indicates that they wish to view the history record for a bucket database, the bucket database is not known (e.g., if the web-based application has access to multiple bucket databases), then, before verifying that the user has the appropriate permissions to access the history record, the file browser tool may be configured to ask the user to select the bucket database that they wish to see the history record for. If it is determined that the user does not have the required permissions to access the history record for the bucket database, then the user may be notified that they do not have sufficient permissions (e.g., the file browser tool may display an error message or notification message).

Figure 5:
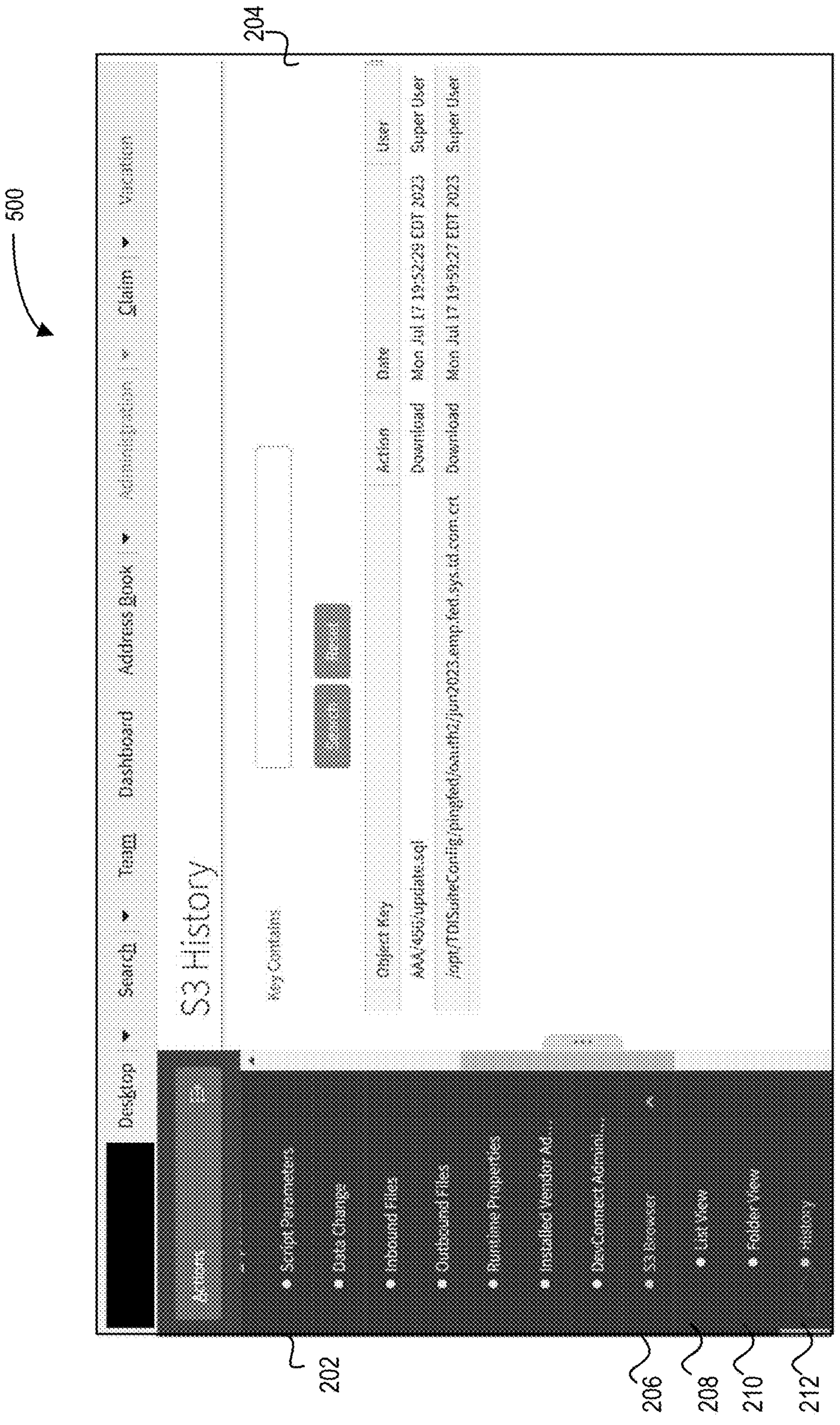
FIG. 5 is a schematic diagram of the GUI of FIG. 1 that displays an example history record for the example bucket database.

If, however, it is determined that the user does have the required permissions to access the history record for the bucket database then the file browser tool may be configured to display the history record. For example, in the GUI 200, 300, 400 of FIGS. 2-4 the history record may be displayed in the display section 204. FIG. 5 illustrates a GUI 500 which represents the GUI 200 of FIG. 2 after the user has clicked or otherwise selected the "History" sub-action 212 in the action section 202. The display section 204 has been updated to display the history record for the "136102052474-dev-sftp-ca-central-1" bucket database. In this example, the history record comprises two entries. Each entry comprises the data object key name, the action (operation or upload), the date and time the action was performed, and the user that performed the action. The first entry indicates that the data object with the name "update.sql" in the folder path "AAA/456/" was downloaded by "Super User" on Jul. 17, 2023. The second entry indicates that the data object with the name "jun2023.emp.fed.sys.td.com.crt" in the folder path "/opt/TDISuiteConfig/pingfed/oauth2/" was downloaded by "Super User" on Jul. 17, 2023.

Data Object Key Name Search in Bucket Database

In some cases, in addition to allowing a user to browse the data objects in one or more bucket databases via the hierarchical folder structure presented by the data object key names, the file browser tool may also allow the user to search for data objects using search terms. Specifically, once a user has selected a bucket database and a folder path within that bucket database, the user may be able to search for object key names in the selected folder path with a specific search term by providing a search term to the file browser tool and indicating to the file browser tool that a search is to be performed. As described above, a folder path may specify none, one, or more than one folder. A folder path with no folders indicates that the path or location is at the root of the bucket database.

For example, as shown in FIGS. 2-4, the GUI 200, 300, 400 presented by the web-based application may comprise a search field 218 in which the user can enter a search term, and a "Search" button 220 which, when clicked or otherwise selected (and the user has the required permissions) causes the file browser tool to identify data object key names in the currently selected folder path of the currently selected bucket name that comprise the specified search term and display the results. Specifically, when the user clicks or otherwise selects the "Search" button 220 the file browser tool may receive the search term in the search field 218 and determine whether the at least one role associated with the user has permission to conduct a search, and more specifically whether the at least one role associated with the user has permission to conduct a search in the selected folder path of the selected bucket database. If it is determined that the at least one role associated with the user does not have permission to conduct the search, then the file browser tool may notify the user that they do not have sufficient permissions to conduct the search (e.g., the file browser tool may display an error message or a notification message). If, however, it is determined that the at least one role associated with the user does have permission, the file browser tool may be configured to identify data object key names in the currently selected folder path of the currently selected bucket name that comprises the specified search term and display the results.

For example, in the GUI 200 of FIG. 2 the selected bucket database is the "136102052474-dev-sftp-ca-central-1" bucket database and the selected folder path comprises no folders (i.e., the user has selected the root). Accordingly, if the user enters a search term in the search field 218 and clicks or otherwise selects the "Search" button 220 in the GUI 200 of FIG. 2 then the file browser tool searches the whole bucket database ("136102052474-dev-sftp-ca-central-1") for object data key names that comprise the entered search term. Similarly, in the GUI 300 of FIG. 3 the selected database is the "136102052474-dev-sftp-ca-central-1" bucket database and the selected folder path comprises "sit003". Accordingly, if the user enters a search term in the search field 218 and clicks or otherwise selects the "Search" button 220 in the GUI 300 of FIG. 3 then the file browser tool searches the object data key names in the "sit003" folder for object data key names that comprise the entered search term.

In some cases, the file browser tool may be configured to identify data object key names in the currently selected folder path of the currently selected bucket name that comprise the specified search term by searching the object key names that were received or identified when the user selected the current folder path. For example, as described above, in response to selecting, for example, the "sit003" folder the file browser may, in response to sending a request, receive a list of object data key names in the "sit003" folder (i.e., object key names that comprise "sit003" in the prefix portion). The file browser tool may then, when the search button is clicked or otherwise selected, search the received object key names for object key names that comprise the specified search term.

However, in other cases, the file browser tool may be configured to identify data object key names in the currently selected folder path of the currently selected bucket name that comprise the specified search term by sending a search request to the cloud computing system 102 for object data key names that begin with the currently selected folder path (e.g., "sit003/". In response, the cloud computing system 102 may send the web-based application, and specifically, the file browser plug-in 110 thereof, a list of data object key names that begin with the currently selected folder path. The file browser tool may then, search the received data object key names for the specified search term.

In some cases, the file browser tool may be configured to display the results (the identified data object key name with the specified search term) in a folder structure. Specifically, the file browser tool may be configured to roll up all the data object key names with the search term that share a common prefix. In other words, if multiple data object key names with the search term have the same folder path (i.e., are in the same folder), then, instead of displaying each of those data object key names, the shared folder path may be displayed to represent those data object key names. For example, if the selected folder path is "Folder_A" (i.e., the search is to be performed in Folder_A), "Folder_A" has the following data object key names, and the search term is "A-2-1", then there are five data object key names that meet the search criteria "Folder_A/SubFolder_A-2/Sub-Subfolder_ A-2-1/dataobject3", "Folder_A/SubFolder_A-2/Sub-Subfolder_A-2-1/dataobject 4", "Folder_A/SubFolder_A-2/Sub-Subfolder_A-2-1/dataobject5", "Folder_A/SubFolder_A-2/A-2-1dataobject1", and "Folder_A/SubFolder_A-2/A-2-1 dataobject2. In this example only "Sub-folder_A-2" and is displayed since all the results share this prefix.

Folder_A/subfolder_A-1/dataobject1
Folder_A/SubFolder_A-1/dataobject2
Folder_A/SubFolder_A-2/Sub-Subfolder_A-2-1/dataobject3
Folder_A/SubFolder_A-2/Sub-Subfolder_A-2-1/dataobject4
Folder_A/SubFolder_A-2/Sub-Subfolder_A-2-1/dataobject5
Folder_A/SubFolder_A-2/A-2-1dataobject1
Folder_A/SubFolder_A-2/A-2-1dataobject2

In some cases, the file browser tool may be configured to display only the sequence of names in the results (the identified data object key name with the specified search term) after the currently selected folder path and up to and including the search term. For example, if the selected folder path is "Folder_A" (i.e., the search is to be performed in Folder_A), "Folder_A" has the following data object key names, and the search term is "A-2-1", then there are five data object key names that meet the search criteria "Folder_A/SubFolder_A-2/Sub-Subfolder_A-2-1/dataobject3", "Folder_A/SubFolder_A-2/Sub-Subfolder_A-2-1/dataobject4", "Folder_A/SubFolder_A-2/Sub-Subfolder _A-2-1/dataobject5", "Folder_A/SubFolder_A-2/A-2-1dataobject1", and "Folder_A/SubFolder_A-2/A-2-1dataobject2". In this example, "SubFolder_A-2/Sub-Subfolder _A-2-1", "SubFolder_A-2/A-2-1dataobject1" and "SubFolder_A-2/A-2-1dataobject2" may be displayed.

Folder_A/SubFolder_A-1/dataobject1
Folder_A/SubFolder_A-1/dataobject2
Folder_A/SubFolder_A-2/Sub-Subfolder_A-2-1/dataobject3
Folder_A/SubFolder_A-2/Sub-Subfolder_A-2-1/dataobject4
Folder_A/SubFolder_A-2/Sub-Subfolder_A-2-1/dataobject5
Folder_A/SubFolder_A-2/A-2-1dataobject1
Folder_a/subfolder_A-2/A-2-1dataobject2

In some cases, the file browser tool may be further configured to filter the search results that are displayed based user permissions. For example, before displaying the search results, the file browser tool may be configured to determine, for each of the search results, whether the at least one role associated with the user has permission to access that result, and only displaying that result if the user has sufficient permissions.

Flat Data Structure View

In some cases, in addition to the file browser tool allowing a user to browse the data objects in one or more bucket databases via the hierarchical folder structure presented by the data object key names (which may be referred to herein as the "folder view" of a bucket database), the file browser tool may also allow the user to browse the data objects in one or more bucket databases in a flat data structure (which may be referred to as the "list view" of a bucket database). Specifically, in the folder view (as shown in FIGS. 2 to 5) when a user selects a folder path of a bucket database the name of any folders and data objects that sit at that folder path are displayed and any of the displayed folders can be clicked or otherwise selected to see the names of folders and data objects within the selected folder. In contrast, in the list view the full key names of all of the data objects in the bucket database are displayed and the user cannot select a specific folder or sub-folder to view.

In some cases, the user may be able to switch between folder view and list view by making a selection in the file browser tool. For example, in the GUI 200, 300, 400, 500 of FIGS. 2-5 the user may switch between folder view and list view by selecting different sub-actions in the action section 202. Specifically, the user can browse data objects in a bucket database in folder view by selecting the "Folder View" sub-action 210, and the user can browse data objects in a bucket database in list view by selecting the "List View" sub-action 208. In some cases, the folder view may be the default view—i.e., the view that is automatically displayed when the user activates the file browser tool (e.g., by clicking or otherwise selecting the "S3 Browser" action 206).

Figure 6:
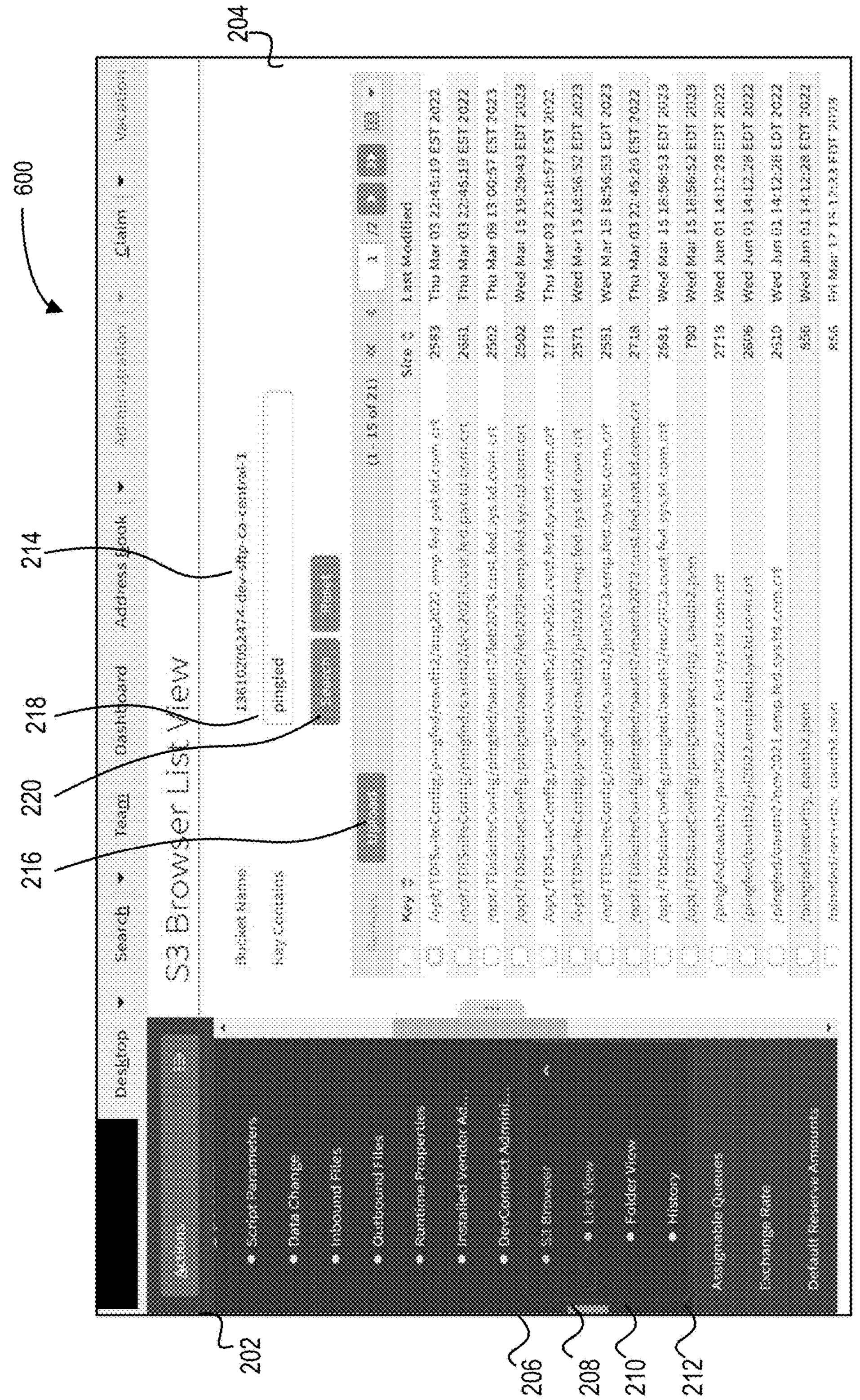
FIG. 6 is a schematic diagram of the GUI of FIG. 1 that displays the results of an example search of the example bucket database in list view.

In some cases, the user may be able to perform a key name search in list view. For example, while in list view the user may be presented with a search field (where the user can enter a search term) and a search button (or the like), which, when clicked or otherwise selected, causes the file browser tool to identify and display data object key names in the selected bucket database that comprise the search term anywhere therein. See, for example, the GUI 600 of FIG. 6, which is the GUI 200 of FIG. 2 after the user has clicked or otherwise selected the "List View" sub-action 208 and then activated a search of the bucket database for data object key names with the term "pingfed" by entering "pingfed" in the search field 218 and clicking or otherwise selecting the "Search" button 220. The display section 204 of the GUI 600 shows all data object key names (up to a maximum number displayable) in the bucket database ("136102052474-deve-sftp-ca-central-1") that comprise the search term ("pingfed") anywhere therein.

In some cases, just like folder view, when the user is in list view the user may be able to perform one or more operations on a data object that is displayed. Performing an operation on a data object displayed in list view may be performed in a similar manner as a data object displayed in folder view. For example, in some cases, the user may be able to perform a desired operation on a displayed data object by using the file browser tool to select the data object and indicate an operation to be performed on the selected data object. The one or more operations may include one or more of viewing the data object, modifying the data object and deleting the data object. For example, in the example GUI 600 of FIG. 6 the user may select a data object name displayed in the display section 204 by clicking on the data object name or ticking the box to the left of the data object name, and then indicate the desired operation to be performed. For example, in some cases when the user clicks on a data object name the user may be presented with a list of operations that can be performed on the selected data object such as, but not limited to, download (e.g., view), edit and delete/remove and the user may have the ability to select one of the listed operations. In some cases, when the user ticks the box to the left of a data object name a "Remove" button may appear (it is greyed out in the GUI 600 shown in FIG. 6), and the user can delete the data object for which the box is ticked by clicking or otherwise activating the "Remove" button.

In such cases, once the user has selected a data object and indicated an operation to perform on that data object, the file browser tool may be configured to first determine whether the at least one role associated with the user has permission to perform the indicated operation on the selected data object. If it is determined that the at least one role associated with the user does not have permission to perform the desired operation on the selected data object, then the user may be notified that they do not have the appropriate permissions to perform the desired operation (e.g., the file browser tool may display an error message or a notification message). If, however, it is determined that the at least one role associated with the user does have permission to perform the desired operation then the file browser tool causes the identified operation to be performed on the selected. How the file browser tool causes the identified operation to be performed may depend on the identified operation. For example, if the operation is a "view" operation then the file browser tool may send a download request to the cloud computing system 102 comprising the bucket name, and the data object key name, and in response the file browser tool may receive the selected data object and display the contents of the selected data object to the user in, for example, the display section or another section or window. Where, however, the operation is a "delete" operation then the file browser tool may send a delete request to the cloud computing system 102 comprising the bucket name and the data object key name, and in response the cloud computing system 102 may delete the data object from the bucket database.

In some cases, just like folder view, when the user is in list view the user may be able to add or upload new data objects to the one or more bucket databases. Specifically, the user may be able to provide input to the file browser tool indicating that they wish to add a new data object to the bucket database. In some cases, the GUI presented by the file browser tool may have a button or other input element that the user can activate to indicate that they wish to add a data object to the currently selected bucket database. For example, the GUI 600 shown in FIG. 6 comprises an "Upload" button 216 which when clicked, or otherwise selected, indicates to the file browser tool that the user wishes to add a data object to the currently selected bucket database. Specifically, in the example GUI 600 of FIG. 6 the currently selected bucket database is the "136102052474-dev-sftp-ca-central-1" bucket database thus if the user clicked or otherwise selected the "Upload" button 216 in the GUI 600 of FIG. 6 the user indicates to the file browser tool that they wish to upload a new data object to the root of the "136102052474-dev-sftp-ca-central-1" bucket database.

Once the user has indicated that they wish to add or upload a file to the currently selected bucket database (e.g., by clicking on the "Upload" button 216) then the file browser tool may be configured to first determine whether the at least one role associated with the user has permission to upload a data object to the currently selected bucket database. If it is determined that the at least one role associated with the user does not have permission to upload a data object to the currently selected bucket database, then the user may be notified that they do not have sufficient permissions to perform the desired upload (e.g., the file browser tool may display an error message or a notification message). If, however, it is determined that the at least one role associated with the user does have permission then the file browser tool may be configured to cause the upload of a new data object to the currently selected bucket database. The file browser tool may be configured to cause a new data object to be uploaded to the currently selected folder path of the currently selected bucket database by providing an interface to the user which allows the user to select the data object (e.g., file) that they wish to upload and specify an key name for the data object, and once the user has selected the data object (e.g. file they wish to upload) the file browser tool may send to the cloud computing system 102 the selected data object along with instructions to store the data object in the selected bucket database with the specified key name. The data object may be given a key name that specifies one or more folders and/or sub-folders such that when the bucket database is viewed in folder view the data object appears in a desired folder.

Figure 7:
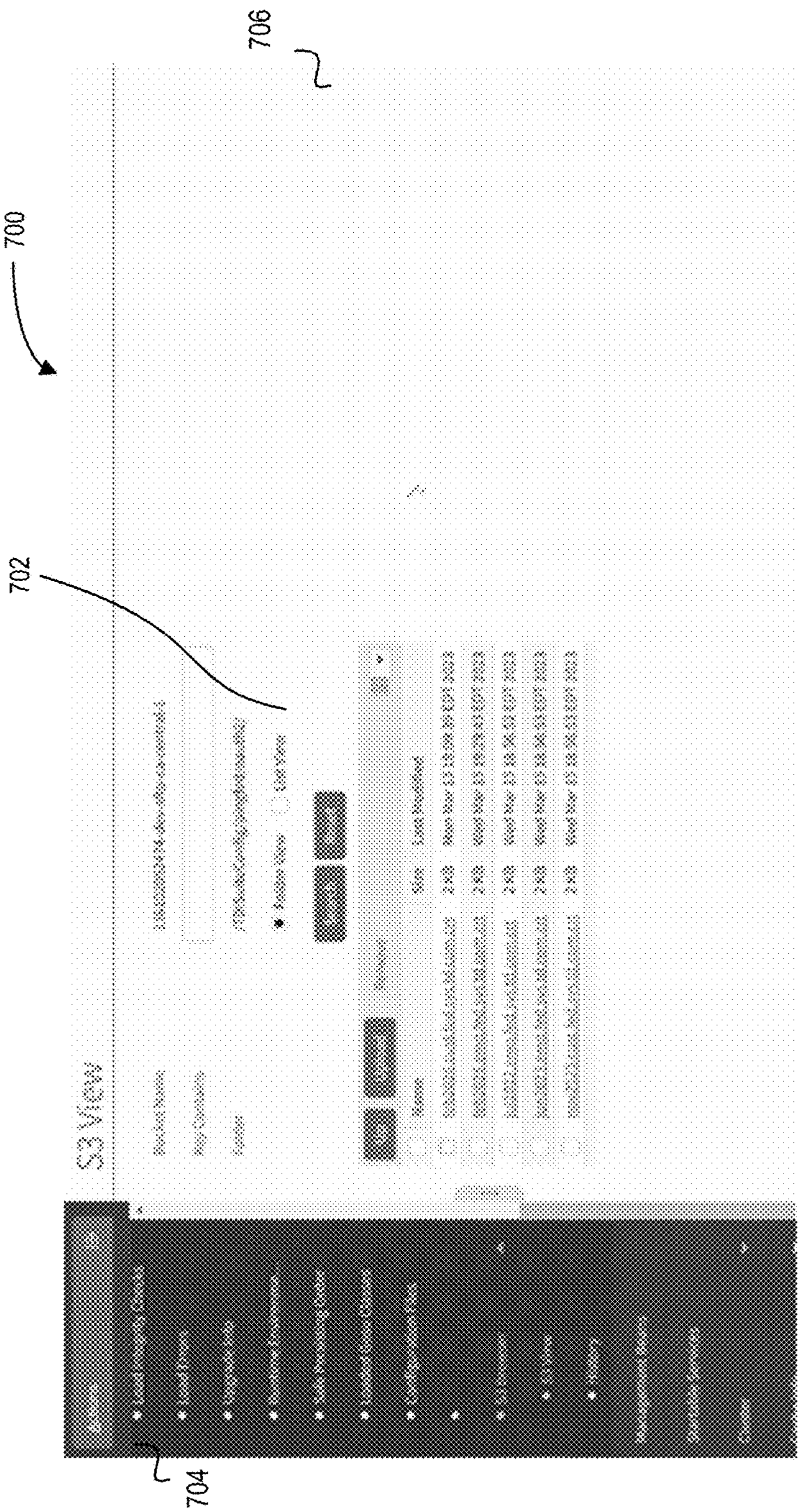
FIG. 7 is a schematic diagram of an alternative GUI that displays a folder view of an example bucket database after the user has selected a series of folders and sub-folders.

While FIGS. 2 to 6 to show a GUI 200, 300, 400, 500, 600 in which the user may switch between list view and folder view by selecting different sub-actions 208, 210 in the action section 202, this is only an example of how a user may switch between list view and folder view. In other examples, the user may be able to switch between list view and folder view in other ways. For example, FIG. 7 shows an alternate GUI 700 which may be presented by the web-based application for browsing data objects in one or more bucket databases in folder view or list view wherein the user can switch between folder view and list view via a toggle switch or selection 702. Specifically, the user can select folder view by selecting the Folder View selection button and list view by selecting the List View selection button. The GUI 700 of FIG. 7 is the same as the GUI 400 of FIG. 4—i.e., it has an action section 704 and a display section 706, except that the action and sub-action options in the action section 704 are different and the GUI 700 of FIG. 7 and the display section 706 comprises a Folder View/List View toggle selection 702. Thus, the GUI 700 of FIG. 7 generally operates in the same manner as described above with respect to the GUIs 200, 300, 400, 500, 600 of FIGS. 2-6.

Authentication Certificates

Figure 8:
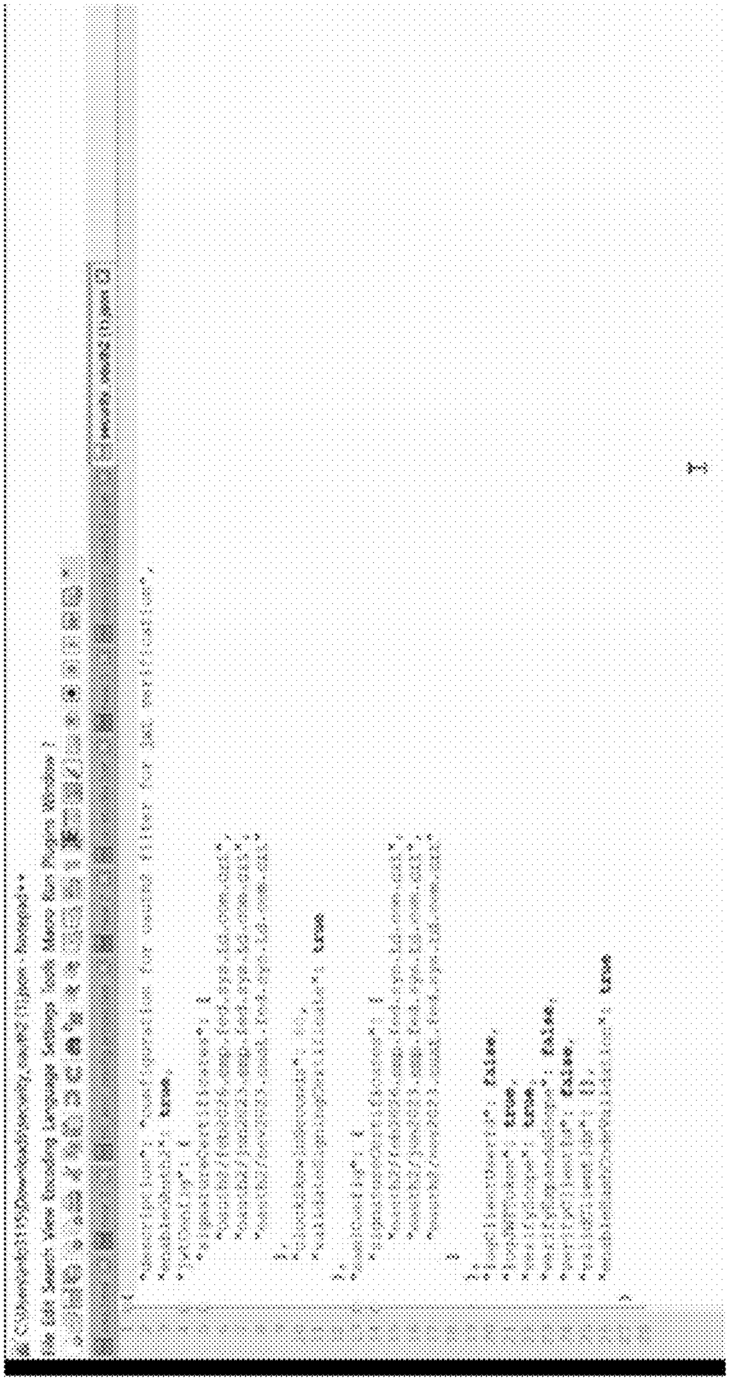
FIG. 8 is a schematic diagram of example JSON file for updating one or more authenticate certificates.

In some cases, the web-based application may use authentication certificates (e.g., OAuth certificates) to access subsystems of the client system and it is the authentication certificates (e.g., OAuth certificates) that are stored as objects (optionally, with other data objects) in the bucket database accessible by the web-based application. In such cases the bucket database may be referred to as a certificate bucket database.

Where the web-based application has access to a certificate bucket database the file browser tool may be configured to automatically upload a plurality of certificates to a certificate bucket database by executing a JSON configuration file. The JSON configuration file comprises text identifying the set of certificates. An example of such a JSON configuration file is shown in FIG. 8.

Each authentication certificate stored in a certificate bucket database may be stored with a key name that comprises the authentication certificate name optionally preceded by one or more folder names. However, the JSON file only stores part of the file name and may not store all of the prefix. Accordingly, in some cases, the file browser tool may perform a search for a particular authentication certificate by performing a reverse character string search. For example, if an authentication certificate has a name "abc.123.crt" and the authentication certificate key name is "cert_folder/abc.123.crt" the reverse character string search includes generating a reversed authentication certificate name ("trc.321.cba") and searching for these characters in the key names from the last character and moving backwards.

APIs

In some cases, the web-based application cannot access (i.e., search or perform operations on) the bucket database(s) 104 directly, but instead accesses the bucket databases through one or more application programing interfaces (APIs) of the cloud computing system 102. In such cases, the file browser tool may be configured to, when it wants to request information about or data objects from a bucket database, may automatically generate and send the appropriate API request to retrieve the desired information and/or data objects.

For example, AWS S3 supports the REST API which supports HTTP commands such as, but not limited to, GET, PUSH, POST and HEAD. In some cases, the file browser tool may be configured to use a HEAD request or command (vs a GET request or command) to retrieve all the data object key names in a bucket database or all the data object key names in a bucket database within a certain folder (i.e., with a prefix that matches the folder path) since a HEAD request only returns metadata from an object without returning the object itself. In other cases, the file browser tool may be configured to use a special GET command to retrieve all the data object key names in a bucket database or all the data object key names in a bucket database within a certain folder (i.e., with a prefix that matches the folder path) Specifically, a GET Object (ListObjects) or a GET Object (List Objects) Version 2 request or command can be used to obtain some or all of the data objects or data object key names in bucket. Specifically, the parameters of this command, and specifically the prefix parameter, can be used to identify data object keys that, for example, begin with a certain term or phrase. For example, the following is an example GET Objects (ListObjects) command to return all the object data key names in the "TEST" bucket database that start with "E".

GET/?prefix=E HTTP/1.1

Host: TEST.s3.<Region>.amazonaws.com

Date: Wed, 1 Mar. 2024 12:00:00 GMT

Authorization: authorization string

In some cases, the file browser tool may be configured to use a traditional GET request or command to retrieve data objects themselves.

Method

Figure 9:
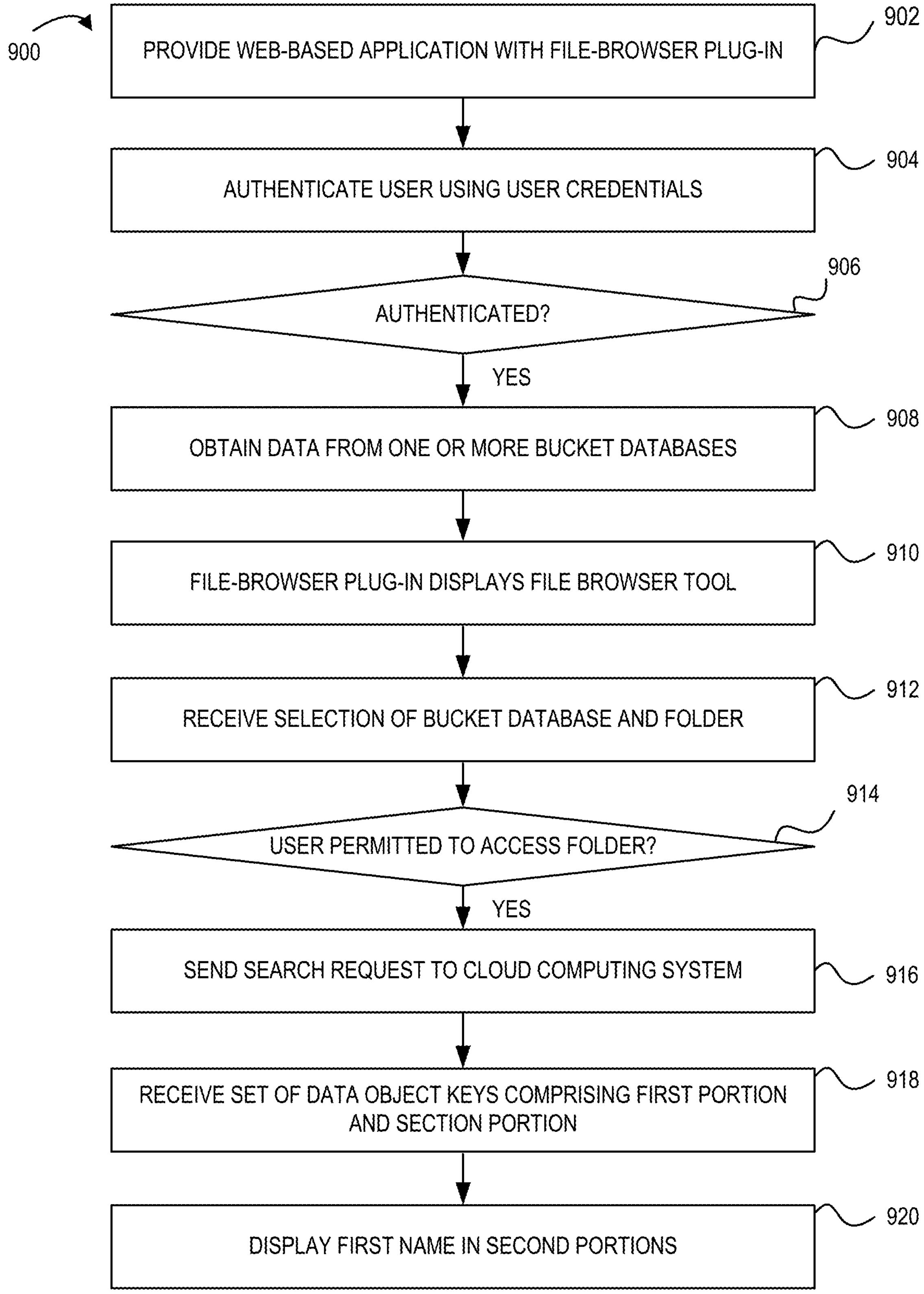
FIG. 9 is a flow diagram of an example method for implementing a web-based database system.

Reference is now made to FIG. 9 which illustrates an example method 900 for accessing a cloud database which may be implemented by, for example, the web-based database system 100 of FIG. 1. The method 900 begins at block 902 where a web server provides a web-based application (e.g., web-based application 108) that includes a file-browser plug-in (e.g., file browser plug-in 110). The method 900 then proceeds to block 904 where a user of the web-based application is authenticated using a user credential associated with at least one role. As described above, in some cases, the user may be authenticated through a SSO provided by a client system. In other words, in some cases the user may be able to sign into the client system using a set of credentials which then can be used to sign into the web-based application. At block 906 it is determined whether the user has been authenticated. If the user has been authenticated, then the method 900 proceeds to block 908. If, however, the user has not been authenticated then the method 900 ends.

At block 908, the web-based application obtains data from one or more bucket databases stored in a cloud computing system using a provider credential associated with the web-based application. Accordingly, the credentials used by the web-based application to access the one or more bucket databases are different from the credentials used by the user for authentication to the web-based application. As described above, in the examples described herein each bucket database of the one or more bucket databases stores one or more data objects in a flat data structure and each data object is associated with a data object key name. Each data object key name comprises a sequence of one or more names wherein the names in the sequence are separated by a special character (e.g., delimiter). Each sequence of names comprises one or more folder names followed by an object data name. The folder names define a virtual hierarchical folder structure over the flat data structure. Once the data has been obtained the method 900 proceeds to block 910.

At block 910, the file browser plug-in displays a file browser tool for browsing the data objects in the one or more bucket databases. Once the file browser tool has been displayed, the method 900 proceeds to block 912.

At block 912, a user's selection in the file browser tool identifying a particular bucket database and a particular folder name is received. For example, as described above, in the GUI 200 of FIG. 2 the user may select a particular folder name by clicking on it. Once the selection of a bucket database and a particular folder name is received, the method proceeds to block 914.

At block 914, it is determined, from the one or more roles associated with the user, whether the user has permission to access the selected folder in the selected bucket database. If it is determined that the user does not have sufficient permission to access the selected folder in the selected bucket database, then the method 900 may end. If, however, the user has permission to access the selected folder in the selected bucket database then the method 900 proceeds to block 916.

At block 916, a search request is automatically sent to the cloud computing system (e.g., cloud computing system 102) for the data object key names for data objects that are in the particular folder name of the particular bucket database. The search request comprises information identifying the particular bucket database (e.g., the name of the particular bucket database) and the particular folder name.

At block 918, in response to the request, a set of one or more object data key names are received for data objects in the particular bucket database. Each data object key name in the received set is divisible into a first portion and a second portion wherein the first portion comprises names in the sequence of names up to and including the particular folder name and the second portion comprises the names in the sequence of names following the particular folder name. Once the set of one or more object data key names are received, the method 900 proceeds to block 920.

At block 920, the first name in the second portion of each of the received one or more data object key names is displayed in the file browser tool. As described above, the first name in the second portion of each of the received one or more data object key names will be either a sub-folder name in the particular folder (according to the hierarchical folder structure set forth by the data object key names), or a data object name that is situated in the particular folder (according to the hierarchical folder structure set forth by the data object key names). Accordingly, this will display the names of sub-folders of, and data objects in, the particular folder.

Example Computer

Figure 10:
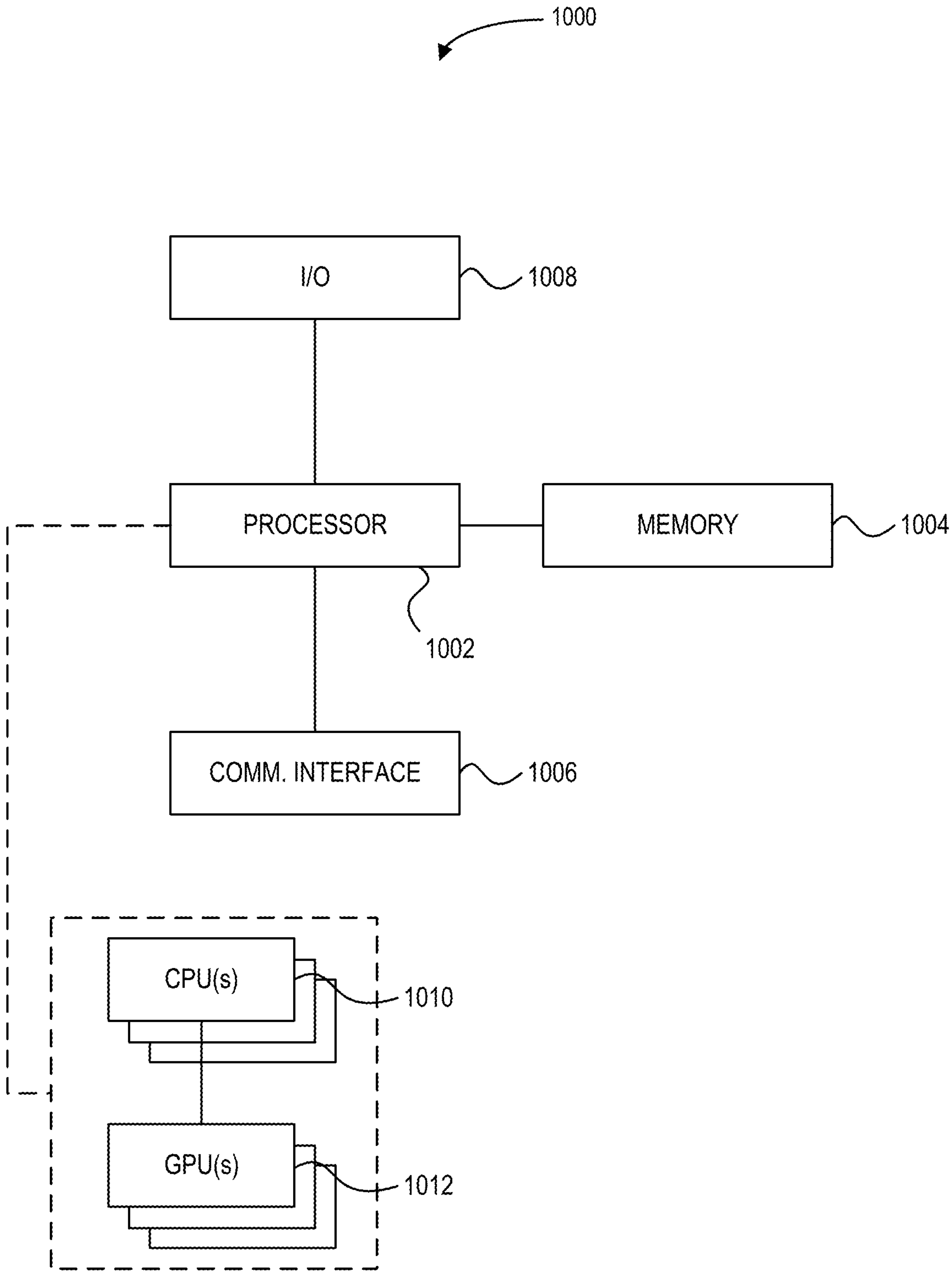
FIG. 10 is a block diagram of an example computer which may be used to implement all or a portion of the system of FIG. 1 and/or execute all or a portion of the method of FIG. 9.

Reference is now made to FIG. 10 which illustrates a simplified block diagram of an example computer 1000. Computer 1000 is an example implementation of a computer which may implement all or a part of the cloud computing system 102, web server 106 and/or client system 116 of FIG. 1. Computer 1000 has at least one processor 1002 operatively coupled to at least one memory 1004, at least one communications interface 1006 (also referred to herein as a network interface), and at least one input/output (I/O) device 1008.

The at least one memory 1004 includes a volatile memory that stores instructions executed or executable by the processor 1002, and input and output data used or generated during execution of the instructions. The memory 1004 may also include non-volatile memory used to store input and/or output data-e.g., within a database-along with program code containing executable instructions.

The processor 1002 may transmit or receive data via the communications interface 1006 and may also transmit or receive data via any additional input/output device 1008 as appropriate.

In some cases, the processor 1002 includes a system of central processing units (CPUs) 1010. In other cases, the processor 1002 includes a system of one or more CPUs 1010 and one or more Graphical Processing Units (GPUs) 1012 that are coupled together.

Various systems or processes have been described to provide examples of embodiments of the claimed subject matter. No such example embodiment described limits any claim and any claim may cover processes or systems that differ from those described. The claims are not limited to systems or processes having all the features of any one system or process described above or to features common to multiple or all the systems or processes described above. It is possible that a system or process described above is not an embodiment of any exclusive right granted by issuance of this patent application. Any subject matter described above and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth to provide a thorough understanding of the subject matter described herein. However, it will be understood by those of ordinary skill in the art that the subject matter described herein may be practiced without these specific details. In other instances, well-known methods, procedures, and components have not been described in detail so as not to obscure the subject matter described herein.

The terms "coupled" or "coupling" as used herein can have several different meanings depending in the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "operatively coupled" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g., 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the result is not significantly changed.

Some elements herein may be identified by a part number, which is composed of a base number followed by an alphabetical or subscript-numerical suffix (e.g., 112*a*, or 112*b*). All elements with a common base number may be referred to collectively or generically using the base number without a suffix (e.g., 112).

The systems and methods described herein may be implemented as a combination of hardware or software. In some cases, the systems and methods described herein may be implemented, at least in part, by using one or more computer programs, executing on one or more programmable devices including at least one processing element, and a data storage element (including volatile and non-volatile memory and/or storage elements). These systems may also have at least one input device (e.g., a pushbutton keyboard, mouse, a touchscreen, and the like), and at least one output device (e.g., a display screen, a printer, a wireless radio, and the like) depending on the nature of the device. Further, in some examples, one or more of the systems and methods described herein may be implemented in or as part of a distributed or cloud-based computing system having multiple computing components distributed across a computing network. For example, the distributed or cloud-based computing system may correspond to a private distributed or cloud-based computing cluster that is associated with an organization. Additionally, or alternatively, the distributed or cloud-based computing system be a publicly accessible, distributed or cloud-based computing cluster, such as a computing cluster maintained by Microsoft Azure™, Amazon Web Services™, Google Cloud™, or another third-party provider. In some instances, the distributed computing components of the distributed or cloud-based computing system may be configured to implement one or more parallelized, fault-tolerant distributed computing and analytical processes, such as processes provisioned by an Apache Spark™ distributed, cluster-computing framework or a Databricks™ analytical platform. Further, and in addition to the CPUs described herein, the distributed computing components may also include one or more graphics processing units (GPUs) capable of processing thousands of operations (e.g., vector operations) in a single clock cycle, and additionally, or alternatively, one or more tensor processing units (TPUs) capable of processing hundreds of thousands of operations (e.g., matrix operations) in a single clock cycle.

Some elements that are used to implement at least part of the systems, methods, and devices described herein may be implemented via software that is written in a high-level procedural language such as object-oriented programming language. Accordingly, the program code may be written in any suitable programming language such as Python or Java, for example. Alternatively, or in addition thereto, some of these elements implemented via software may be written in assembly language, machine language or firmware as needed. In either case, the language may be a compiled or interpreted language.

At least some of these software programs may be stored on a storage media (e.g., a computer readable medium such as, but not limited to, read-only memory, magnetic disk, optical disc) or a device that is readable by a general or special purpose programmable device. The software program code, when read by the programmable device, configures the programmable device to operate in a new, specific, and predefined manner to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g., downloads), media, digital and analog signals, and the like. The computer usable instructions may also be in various formats, including compiled and non-compiled code.

While the above description provides examples of one or more processes or systems, it will be appreciated that other processes or systems may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be revisited.

What is claimed is:

1. A web-based database system, the system comprising:

server comprising:

a server memory;

a server communication interface; and a server processor operatively coupled to the server memory and the server communication interface, the server processor configured to:

provide a web-based application including a file browser plugin;

authenticate a user of the web-based application using a user credential, the user credential associated with at least one role;

in response to authenticating the user:

obtain data from one or more bucket databases stored in a cloud computing system using a provider credential associated with the web-based application, wherein each bucket database of the one or more bucket databases stores one or more data objects in a flat data structure and each data object of the one or more data objects is associated with a key name, wherein at least one of the key names comprises a sequence of names separated by a predefined symbol, the sequence of names comprising one or more folder names, and a data object name, and display, using the file browser plugin, a file browser tool for browsing the one or more data objects in the one or more bucket databases;

in response to one or more user selections in the file browser tool that identifies a particular bucket database of the one or more bucket databases and a particular folder name, determine whether the at least one role has permission to access the particular bucket database and the particular folder name;

in response to determining that the at least one role has permission to access the particular bucket database and the particular folder name, automatically generate and send a search request to the cloud computing system, the search request comprising information identifying the particular bucket database and the particular folder name;

subsequent to sending the search request, receive one or more key names for data objects in the particular bucket database, wherein each key name of the received one or more key names comprises a first portion that comprises names in the sequence of names up to and including the particular folder name, and a second portion that comprises names in the sequence of names following the particular folder name; and for at least one key name of the received one or more key names, display, in the file browser tool, a first name in the second portion of that key name.

2. The web-based database system of claim 1, wherein the second portion of the key name comprises a subfolder name and a data object name; and the first name in the second portion of that key name is the subfolder name.

3. The web-based database system of claim 2, wherein the server processor is further configured to:

in response to the user selecting, via the file browser tool, the subfolder name, determine whether the at least one role has permission to access the subfolder name;

in response to determining that the at least one role of the user has permission to access the subfolder name, search all the second portions in the received one or more key names for the subfolder name; and display all or a portion of each key name in the one or more key names that comprises the subfolder name in the second portion of the key name.

4. The web-based database system of claim 2, wherein the subfolder name is displayed in a manner that indicates that the subfolder name is a subfolder that comprises downstream data.

5. The web-based database system of claim 1, wherein the second portion of the key name comprises the data object name; and the first name in the second portion is the data object name.

6. The web-based database system of claim 5, wherein the server processor is further configured to:

in response to the user indicating, via the file browser tool, that an operation is to be to be performed on the object associated with the data object name, determine whether the at least one role has permission to perform the operation on the object; and in response to determining that the at least one role has permission to perform the operation on the object, cause the operation to be performed on the object.

7. The web-based database system of claim 6, wherein the server processor is further configured to record, in a history record for the particular bucket database, that the operation was performed on the object, wherein the history record for the particular bucket database is saved in the server memory.

8. The web-based database system of claim 7, wherein the server processor is further configured to, in response to the user selecting, via the file browser tool, the history record for the particular bucket database, display the history record for the particular bucket database.

9. The web-based database system of claim 6, wherein the operation is one of an edit operation, a download operation and a delete operation.

10. The web-based database system of claim 1, wherein:

the file browser tool displays a search field for receiving a search term for a key name; and the server processor is further configured to, in response to the user entering a search term in the search field:

receive the search term via the search field, determine whether the at least one role has permission to conduct a search, in response to determining that the at least one role has permission to conduct the search, search the second portions of the received one or more key names for the search term, and display all or a portion of at least one key name in the one or more key names that comprises the search term in the second portion of the key name.

11. The web-based database system of claim 10, wherein the second portion of the key name includes the data object name.

12. The web-based database system of claim 1, wherein the server processor is further configured to display, in the file browser tool, a name of the particular bucket database and the particular folder name.

13. The web-based database system of claim 1, wherein the server processor is configured to generate and send the search request comprising the information identifying the particular bucket database and the particular folder name to the cloud computing system by generating and sending one or more requests to an application programming interface of the cloud computing system.

14. The web-based database system of claim 1, wherein the one or more requests sent to the application programming interface of the cloud computing system comprises a GET request.

15. The web-based database system of claim 1, wherein the server processor is configured to authenticate the user of the web-based application using the user credential by authenticating the user using the user credential to a single sign on authentication service associated with the user.

16. The web-based database system of claim 1, wherein at least one of the one or more data objects in the particular bucket database is a file.

17. The web-based database system of claim 1, where the at least one of the one or more bucket databases is a certificate bucket database that stores a plurality of authentication certificates.

18. The web-based database system of claim 17, wherein the server processor is further configured to execute a configuration file that includes names of one or more authentication certificates, and the executing of the configuration file comprises storing the one or more authentication certificates in the certificate bucket database.

19. A method for accessing a web-based database, the method executed in a computing environment comprising a server comprising: a server memory; a server communication interface; and a server processor operatively coupled to the server memory and the server communication interface, and the method comprising:

providing a web-based application including a file browser plugin;

authenticating a user of the web-based application using a user credential, the user credential associated with at least one role;

in response to authenticating the user:

obtaining data from one or more bucket databases stored in a cloud computing system using a provider credential associated with the web-based application, wherein each bucket database of the one or more bucket databases stores one or more data objects in a flat data structure and each data object of the one or more data objects is associated with a key name, wherein at least one of the key names comprises a sequence of names separated by a predefined symbol, the sequence of names comprising one or more folder names, and a data object name, and displaying, using the file browser plugin, a file browser tool for browsing the one or more data objects in the one or more bucket databases;

in response to one or more user selections in the file browser tool that identifies a particular bucket database of the one or more bucket databases and a particular folder name, determining whether the at least one role has permission to access the particular bucket database and the particular folder name;

in response to determining that the at least one role has permission to access the particular bucket database and the particular folder name, automatically generating and sending a search request to the cloud computing system, the search request comprising information identifying the particular bucket database and the particular folder name;

subsequent to sending the search request, receiving one or more key names for data objects in the particular bucket database, wherein each key name of the received one or more key names comprises a first portion that comprises names in the sequence of names up to and including the particular folder name, and a second portion that comprises names in the sequence of names following the particular folder name; and for at least one key name of the received one or more key names, displaying, in the file browser tool, a first name in the second portion of that key name.

20. A non-transitory computer readable medium storing computer executable instructions which, when executed by at least one computer processor, cause the at least one computer processor to carry out a method for accessing a web-based database, the method comprising:

providing a web-based application including a file browser plugin;

authenticating a user of the web-based application using a user credential, the user credential associated with at least one role;

in response to authenticating the user:

obtaining data from one or more bucket databases stored in a cloud computing system using a provider credential associated with the web-based application, wherein each bucket database of the one or more bucket databases stores one or more data objects in a flat data structure and each data object of the one or more data objects is associated with a key name, wherein at least one of the key names comprises a sequence of names separated by a predefined symbol, the sequence of names comprising one or more folder names, and a data object name, and displaying, using the file browser plugin, a file browser tool for browsing the one or more data objects in the one or more bucket databases;

in response to one or more user selections in the file browser tool that identifies a particular bucket database of the one or more bucket databases and a particular folder name, determining whether the at least one role has permission to access the particular bucket database and the particular folder name;

in response to determining that the at least one role has permission to access the particular bucket database and the particular folder name, automatically generating and sending a search request to the cloud computing system, the search request comprising information identifying the particular bucket database and the particular folder name;

subsequent to sending the search request, receiving one or more key names for data objects in the particular bucket database, wherein each key name of the received one or more key names comprises a first portion that comprises names in the sequence of names up to and including the particular folder name, and a second portion that comprises names in the sequence of names following the particular folder name; and for at least one key name of the received one or more key names, displaying, in the file browser tool, a first name in the second portion of that key name.

* * * * *